United States Patent
Yao et al.

(10) Patent No.: US 10,972,195 B1
(45) Date of Patent: Apr. 6, 2021

(54) MUTUAL COUPLING BASED CALIBRATION

(71) Applicant: AST & Science, LLC, Miami, FL (US)

(72) Inventors: Huiwen Yao, Potomac, MD (US);
Sriram Jayasimha, Midland, TX (US)

(73) Assignee: AST & Science, LLC, Miami, FL (US)

( * ) Notice: Subject to any disclaimer, the term of this patent is extended or adjusted under 35 U.S.C. 154(b) by 0 days.

(21) Appl. No.: 17/067,279

(22) Filed: Oct. 9, 2020

Related U.S. Application Data

(60) Provisional application No. 62/976,093, filed on Feb. 13, 2020, provisional application No. 62/951,516, filed on Dec. 20, 2019, provisional application No. 62/914,166, filed on Oct. 11, 2019.

(51) Int. Cl.
| | |
|---|---|
| *H04B 17/21* | (2015.01) |
| *H01Q 13/24* | (2006.01) |
| *H01Q 3/26* | (2006.01) |
| *H04B 17/14* | (2015.01) |

(52) U.S. Cl.
CPC ............. *H04B 17/21* (2015.01); *H01Q 3/267* (2013.01); *H01Q 13/24* (2013.01); *H04B 17/14* (2015.01)

(58) Field of Classification Search
CPC ......... H01Q 3/267; H01Q 13/24; H04B 17/14
See application file for complete search history.

(56) References Cited

U.S. PATENT DOCUMENTS

| | | | |
|---|---|---|---|
| 9,973,266 B1 | 5/2018 | Avellan et al. | |
| 2009/0086690 A1* | 4/2009 | Gu | H04B 7/0417 370/338 |
| 2014/0056381 A1* | 2/2014 | Wang | H04B 7/0617 375/295 |
| 2019/0238216 A1 | 8/2019 | Avellan et al. | |

* cited by examiner

*Primary Examiner* — Kabir A Timory
(74) *Attorney, Agent, or Firm* — Blank Rome LLP

(57) ABSTRACT

An antenna array includes an antenna assembly. The antenna assembly includes a plurality of elements. The antenna assembly is configured to measure a reference combined parameter of a reference element of the plurality of elements, measure a first combined parameter of the reference element and a first neighbor element of the plurality of elements and being adjacent or diagonal with respect to the reference element, calculate a differential parameter according to the first combined parameter and the reference combined parameter, and adjust a parameter of the first neighbor element according to the differential parameter. The parameter of first neighbor element is a phase or a amplitude of first neighbor element. The first combined parameter includes a coupling contribution of the first neighbor element and the reference element, and contributions from a path of the first element and a path of the reference element.

23 Claims, 20 Drawing Sheets

| Transmit from an element and take measurements at all adjacent receive elements around the element | ⌐181 |

| Transmit from another an element and take measurements at adjacent receive elements around the element | ⌐182 |

FIG. 18

| Transmit from an element at inter-antenna assembly boundary and take measurements at all adjacent receive elements | ⌐191 |

| Transmit from another element at inter-antenna assembly boundary and take measurements at adjacent receive elements | ⌐192 |

FIG. 19

MUTUAL COUPLING BASED CALIBRATION

CROSS-REFERENCE TO RELATED APPLICATIONS

This application claims the benefit of priority of U.S. Application No. 62/914,166 filed on Oct. 11, 2019, U.S. Application No. 62/951,516, filed Dec. 20, 2019, and U.S. Application No. 62/976,093, filed Feb. 13, 2020. The entire content of those applications is relied upon and incorporated herein by reference in its entirety.

FIELD

The disclosure relates generally to the field of satellite and more particularly to a method and a system for performing calibration on satellite antenna elements.

BACKGROUND

U.S. Pat. No. 9,973,266 and U.S. Publ. No. 2019/0238216 show a system for assembling a large number of small satellite antennas in space to form a large array (which can form service beams for radio communications with designated "cells" on the Earth's surface). The entire content of those patents is incorporated herein by reference. Each small satellite in the array has of one or more digital beam-forming (DBF) processor(s), a corresponding number of transmit/receive (T/R) module and antenna elements.

SUMMARY

One limitation of phased arrays is that, to form beams in the array assembly to and from ground regions, accurate characterization of the amplitude and phase characteristics of each T/R module (also called calibration) is required. Furthermore, the characteristics of these T/R modules can change significantly with the change of temperature (i.e., the solar radiation received). In low-Earth orbit (LEO) satellites, the temperature change is significant even from minute-to-minute. Calibration must, therefore, be simultaneous with transmit/receive DBF processing and this is facilitated by making multiple calibration measurements simultaneously.

The present disclosure provides details for such a calibration procedure (that co-exists with DBF processing).

Phased arrays are used in communications systems and radar. In time division duplex (TDD) systems, transmit and receive are separated in time, but use the same carrier frequency. In frequency division duplex (FDD), used mostly in communication systems, transmit and receive frequency bands do not overlap. Thus, calibration of the phased array is different at the two frequencies.

In addition, in a space-based phased array, we would like to calibrate it locally, because we would like to avoid the latency and interaction with ground-based calibration aids. To this end, we exploit the mutual coupling between transmit and receive antenna elements of the phased array. The rationale for this is as follows: mutual coupling is not influenced significantly by the rather small temperature coefficient of the materials used in the manufacture of the antenna elements and the linkages in the antenna structure. However, the deformation of the mechanical components in the structure has a much larger effect on the mutual coupling. Mechanical deformation over the array structure can be large, particularly for the lower frequency vibration modes, but the mechanical deformation between neighboring elements can be, by design, small enough so that they can be neglected. These mutual couplings can be measured on a deployed array on the ground before it is launched and can be assumed to stay constant for the lifetime of the satellite. We do, however, also describe calibration of systems where these assumptions cannot be made.

The calibration may include determining the phase and amplitude characteristics of the transmit/receive front-end modules (FEMs), which may include filters, power amplifiers and low-noise amplifiers, diplexers and switches.

We now focus on the distinguishing requirements and methodology of a LEO satellite phased array multi-beam communications system. As we have already stated, re-calibration of the array is so frequent that it must occur simultaneously with service beam operation. Neither can removal of passed-array elements (for inserting calibration sequences) significantly degrade phased array operation nor can the exciting calibration signals cause significant interference to the beams. Also, to calibrate the system, we need to bypass selected FEMs so that the signals can pass from one element to the other. Our description highlights these features, that has not been requirements in erstwhile phased-array communications systems. Out of these challenging requirements emerge the novelties described herein.

As used herein, mutual coupling generally refers to the coupling of a transmit antenna with one of its eight neighboring receive antennas. We assume that there is no mutual coupling between a transmit antenna and a non-adjacent (one-removed) receive antenna. Self-coupling is the coupling between a transmit antenna and its own receive antenna. Self-coupling is an order of magnitude (or more) greater than mutual coupling.

In contrast, the term calibration is a characterization of each elements transmitter's or receiver's analog front end. The transmit front end includes the analog part of the DAC and the amplifiers/filters between the DAC and the matching network to the transmit antenna. The receive front-end includes the matching network between the antenna and the amplifiers/filters and the ADC. It includes the analog part of the ADC. Accordingly, mutual coupling aids calibration.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIGS. 14-19 illustrate example calibration methods.

DETAILED DESCRIPTION

Figure 1:
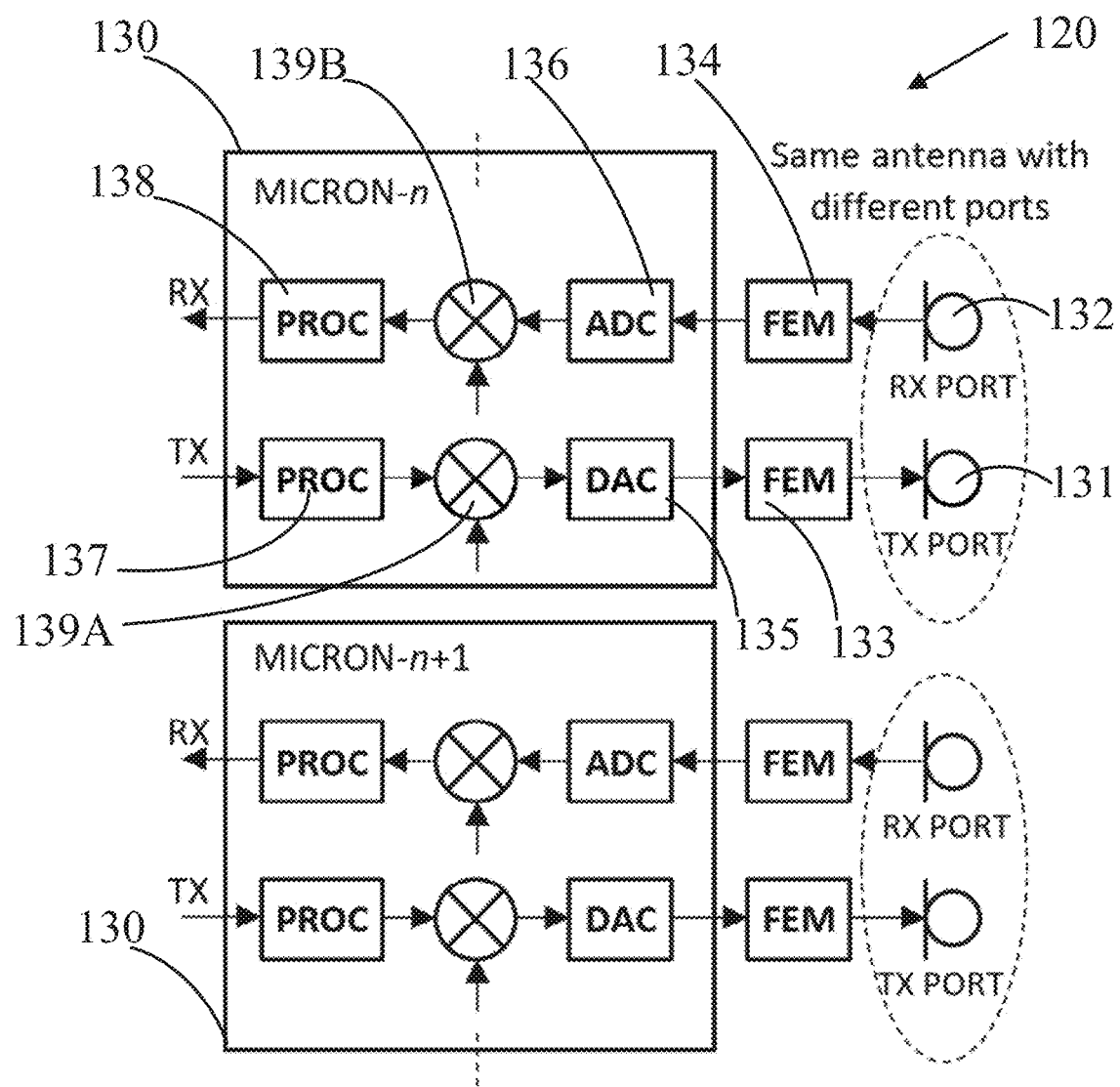
FIG. 1 illustrates an antenna assembly configuration.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings.

Referring to FIG. 1, an antenna assembly 120, e.g., an antenna assembly or sub-array of a phased array antenna, includes multiple antenna elements 130. Two antenna elements MICRON-n, MICRON-n+1 are illustrated, indicating that any suitable number of antenna elements 130 can be utilized. The antenna assembly 120 can also be referred to as a "Micron." In one embodiment shown in FIG. 1, the antenna assemblies 120 are mechanically and/or electronically linked together to form a single continuous phased array of antenna assemblies 120 that create a large array in space, such as shown in U.S. Pat. No. 9,973,266 and U.S. Publ. No. 2019/0238216.

Each antenna element 130 includes a transmit port (TX port) 131 and a receive port (RX port) 132 as shown in FIG. 1. Each antenna element 130 also includes its own DBF processors 137, 138, mixers 139A and 139B, with the mixing frequency driver numerically controlled oscillators (NCOs), tuned to transmit and receive frequencies respectively, which up/down converts baseband signals to/from a desired band such as an LTE band, a digital-to-analog converter (DAC) 135, an analog-to-digital converter (ADC) 136, and analog front end components, lumped as transmit and receive Front End Modules (FEMs) 133, 134 in FIG. 1. Mixing may include multiplication and filtering (to reject unwanted images).

In one example embodiment, the antenna assemblies 120 can be connected to a central processor via a low-jitter and drift clocked high speed serializer/de-serializer (such as SERDES) for common clock distribution. The central processor broadcasts beam signals to transmit beam-forming processing 137 and collects accumulated receive beam-forming processed signals (the output of 138) via the SERDES lines. It also periodically updates transmit and receive beamforming taper and phase information, for each beam, as the satellite traverses its orbit. Additionally, it coordinates the calibration process described herein and phased-array monitoring and control (M&C). The beam-forming sub-system (comprised of the central processor and the phase array of antenna assemblies 120 communicate with a transponder, which in turn communicates, e.g., via satellite, with a ground station antenna. Though a central process is shown, distributed processing can also be provided such as, for example each antenna element 130 having a micro-processor.

Transmit 137 and receive 138 digital beam-forming processing devices consist of, for each beam, multiplying each input signal sample by a taper and phase (determined by the element's location in the phased array) and accumulating the results over the number of beams formed. Finally, the digital data is converted to/from analog data via digital-to-analog converter (DAC, also marked 137) and analog-to-digital converter (ADC, also marked 136). All baseband and RF delays in digital components (including the ADC and DAC) on an antenna assembly 120, as well as neighboring antenna assemblies 120, are tightly controlled/calibrated by the timing of SERDES frames.

Due to phased array structure flexure, the antenna elements 130 in an array 120 can move, but the movements are small, and the position changes are compensated digitally. The local oscillators in each antenna assembly 120 may have a random relative starting phase on power-up or reset. We note that a transmit antenna element (not at edge of the phased array) can radiate to itself (the self-coupling) and its immediate 8 (including adjacent and diagonal) neighbors, but has no or negligible effect on other antenna elements in the array. To achieve phased array calibration, each coupling phase shift must be estimated or known.

In the foregoing, we measure the phase and logarithm of amplitude difference between the receiving path's digital input and the transmitting path's digital output. These measurements are the sum of the transmit path phase, the self/mutual coupling phase, and the receive path phase, and/or the sum of logarithm of amplitude of the transmit path, logarithm of amplitude of the self/mutual coupling phase, and logarithm of amplitude of the receive path. Multiple such measurements are made until all Tx path phases, Rx path phases and carrier phase differences among antenna assemblies are determined. Further, we measure the logarithm of the amplitude ratio of the receiving path's digital input and the transmitting path's digital output, where the measured logarithm of the amplitude ratio is the sum of the logarithms of the transmit path gain, the self/mutual coupling gain, and the receive path gain. Multiple such measurements are made until all the logarithms of the transmit path gain, the mutual coupling amplitude-response, and receive path gain are determined.

In one example, an antenna of an antenna element 130 may include a transmit port 131 and a receive port 132, and the antenna element 130 may transmit via the transmit port 131 to its own receive port 132. In another example, an antenna element 130 may include a transmit antenna 131 and a receive antenna 132, and the antenna element 130 may transmit via the transmit antenna 131 to its own receive antenna 132. Thus, a self-coupling may be, for example, a coupling between an antenna element 130 and itself, via a transmit port 131 of and a receive port 132 of the same antenna element 130, or via a transmit antenna and a receive antenna of the antenna element 130. A mutual coupling may be, for example, a coupling between a first antenna element 130 and a second antenna element 130 that is adjacent to the first antenna element, via a transmit antenna of the first antenna element and a receive antenna of the second antenna element that is adjacent to the first antenna element.

Calibration may be performed at certain points, for example: when a phased-array or the antenna assembly is power cycled or reset; when the operating frequency changes or about to change; when temperature changes substantially (aided by temperature sensors in the antenna assemblies); and/or when there is aging of electronic components. When calibrations are run frequently, recalibration due to aging is automatic. Calibration may be performed, for example, simultaneously with beamforming, reducing interference and gain-loss. Calibration is scan angle independent; and calibrating one beam may apply to all other beams at same carrier.

Figure 2A:
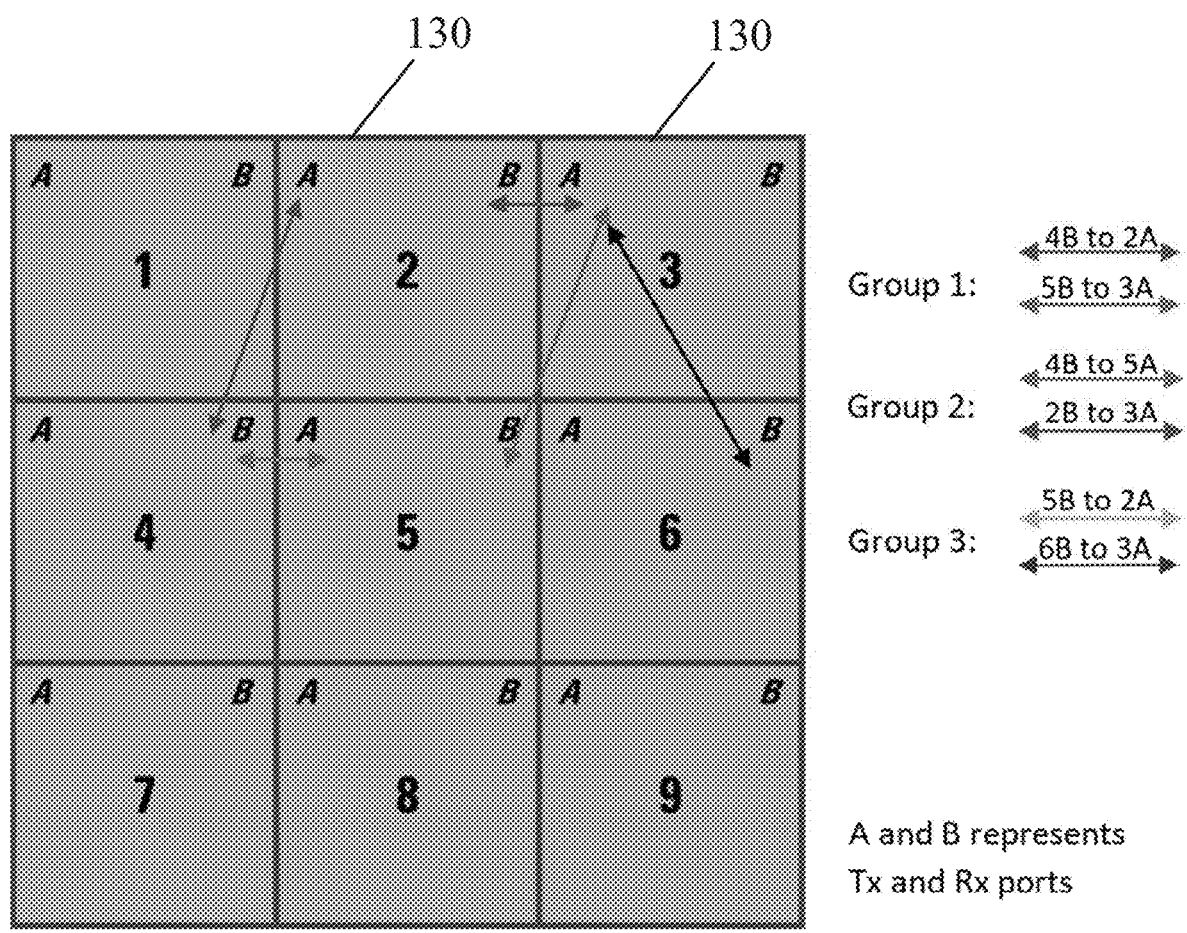
FIG. 2A illustrates a configuration of measurements in 3×3 elements in an antenna assembly.
Figure 2B:
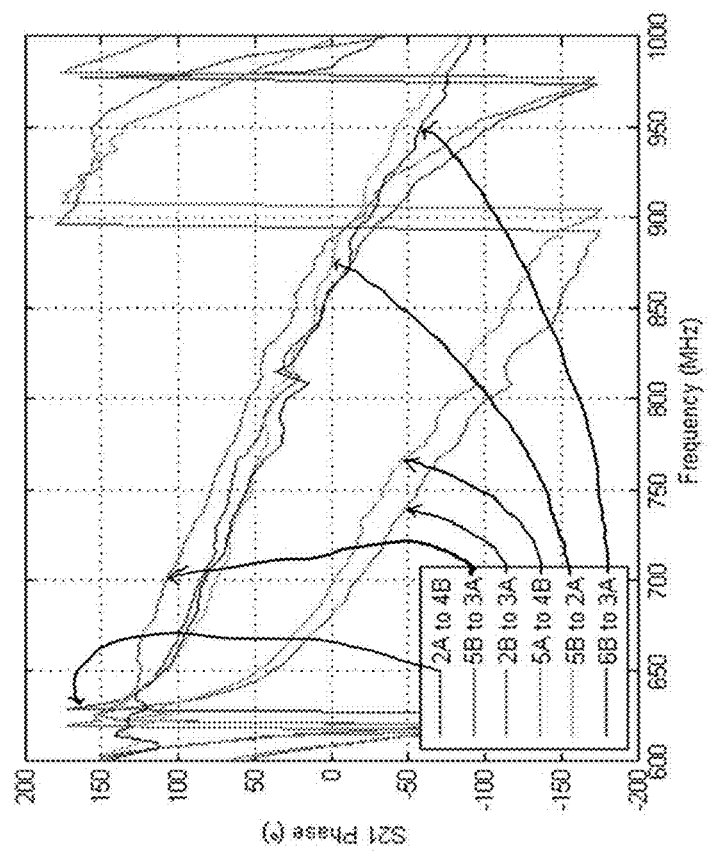
FIG. 2B illustrates mutual coupling amplitude and phase measurements for above sample configurations.
Figure 2B:
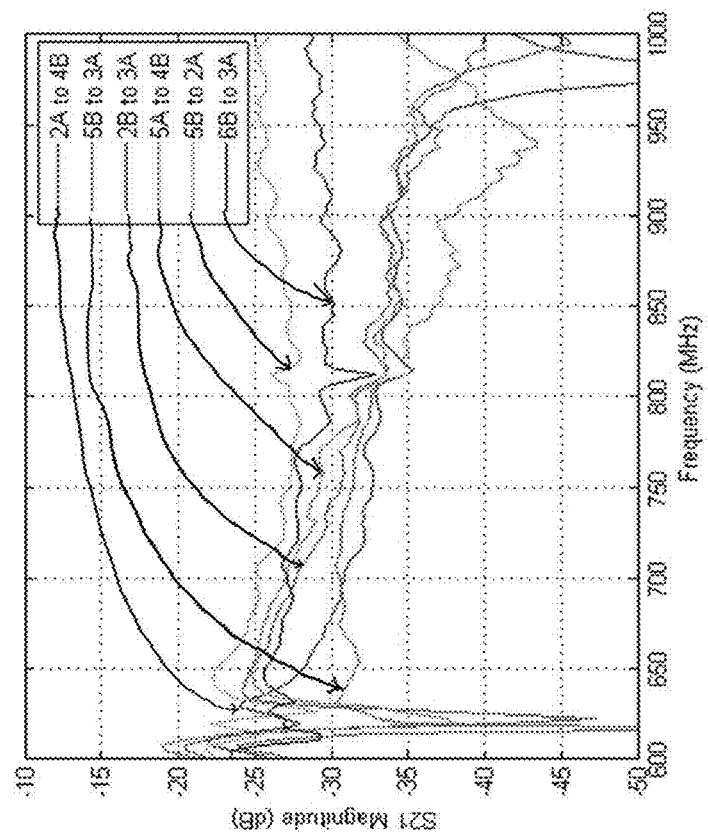

Sample measurements (FIGS. 2A and 2B) show that mutual coupling measurements are very similar for a group with same transmit path to receive path directions (which we can designate by the familiar cardinal directions, N, NE, E, SE, S, SW, W, and NW). In general, for example, the N mutual coupling could be quite different from the NE mutual coupling. In fact, all these are quite different from each other. However, the NE mutual coupling of one element is similar to the NE or another So, a set of mutual coupling measurements in the 8 cardinal directions in the adjacent and diagonal directions may be measured and stored for use later during Tx path and Rx path phase and amplitude calibration estimation (provided these do not materially change with temperature/aging). The 8 cardinal directions may include, for example, 4 adjacent directions and 4 diagonal directions. For example, for element 5, 4 adjacent directions may include a direction from element 5 to element 6, a direction from element 5 to element 4, a direction from element 5 to element 2, and a direction from element 5 to element 8; and 4 diagonal directions may include a direction from element 5 to element 1, a direction from element 5 to element 3, a direction from element 5 to element 7, and a direction from element 5 to element 9. In FIG. 2A, for each element, A represents a Tx port of the element, and B represents a Rx port of the element. For example, 5A represents a Tx port of element 5, and 5B represents a Rx port of element 5. In FIG. 2A, the double-arrow line between 5B and 3A, i.e., the double-arrow line labeled with "5B to 3A," represents a mutual coupling measurement for the coupling between a Rx port of element 5 and a Tx port of element 3. In FIG. 2B, a curve labeled with "5B to 3A" is a curve for a mutual coupling measurement for the coupling between a Rx port of element 5 and a Tx port of element 3. A mutual coupling measurement may include, for example, a mutual coupling amplitude measurement or a mutual coupling phase measurement. Mutual coupling amplitude and phase can be direction dependent. The transmit/receive FEM amplitude and phase can be very different from element-to-element and uncorrelated with the directions they receive signals from, and that are calibrated (or equalized).

Figure 3A:
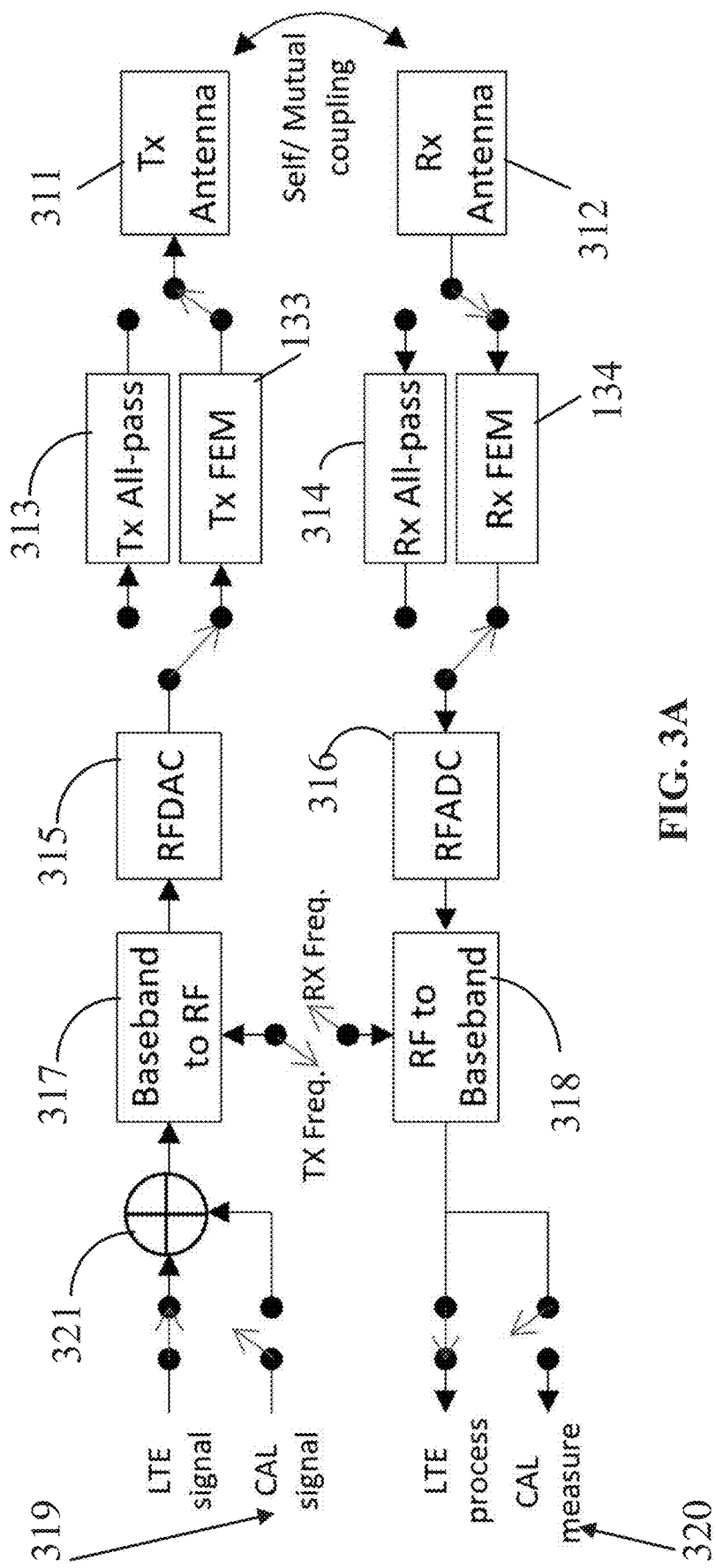
FIG. 3A illustrates default configuration for Tx and Rx beamforming.

FIG. 3A shows default configuration for Tx and Rx beamforming. To enable measurements, a signal (CAL), 319 in FIG. 3A, such as a tone or pseudo-noise (PN) code may be sent by the transmitter to its digital-to-analog converter DAC. A PN code may be, for example, a binary sequence with two-valued autocorrelation. Table 1 below shows the trade-off between the tone and the (PN) code. With the aid of self/mutual coupling to self/adjacent element receive paths, the phase/amplitude measurements are taken in self/adjacent elements. That is, with the aid of self-coupling to self-element receive paths, the phase/amplitude measurements are taken and with the aid of mutual coupling to adjacent element receive path, the phase/amplitude measurements are taken in a neighbor element. Averaging of measurements from multiple adjacent elements reduces the estimation error.

TABLE 1

Tone vs PN sequence CAL signal

| Tone | PN sequence |
|---|---|
| Short averaging time for measurements Potentially interferes with some LTE sub-carriers | Much longer averaging time for measurements Low enough signal that negligibly interferes with LTE signals ($2^N$-1 PN sequence provides about ~6 NdB SNR gain at detector) |

Multiple tones/Gold codes may be used to excite calibration signal from adjacent elements in different antenna assemblies, to avoid interference in measurements. Gold codes are PN sequences that have low cross-correlation and therefore be used by multiple transmitters at the same time reducing interference to each other; the use of such sequences greatly reduces the array's calibration duration. Nine (9) codes are enough to allow simultaneous transmission from neighboring antenna elements, including its own antenna element. Amplitude calibration is unaffected by phase shifts when a constant envelope CAL signal is used (such as tones/Gold codes).

Configuration for Different Operating Modes

Figure 3B:
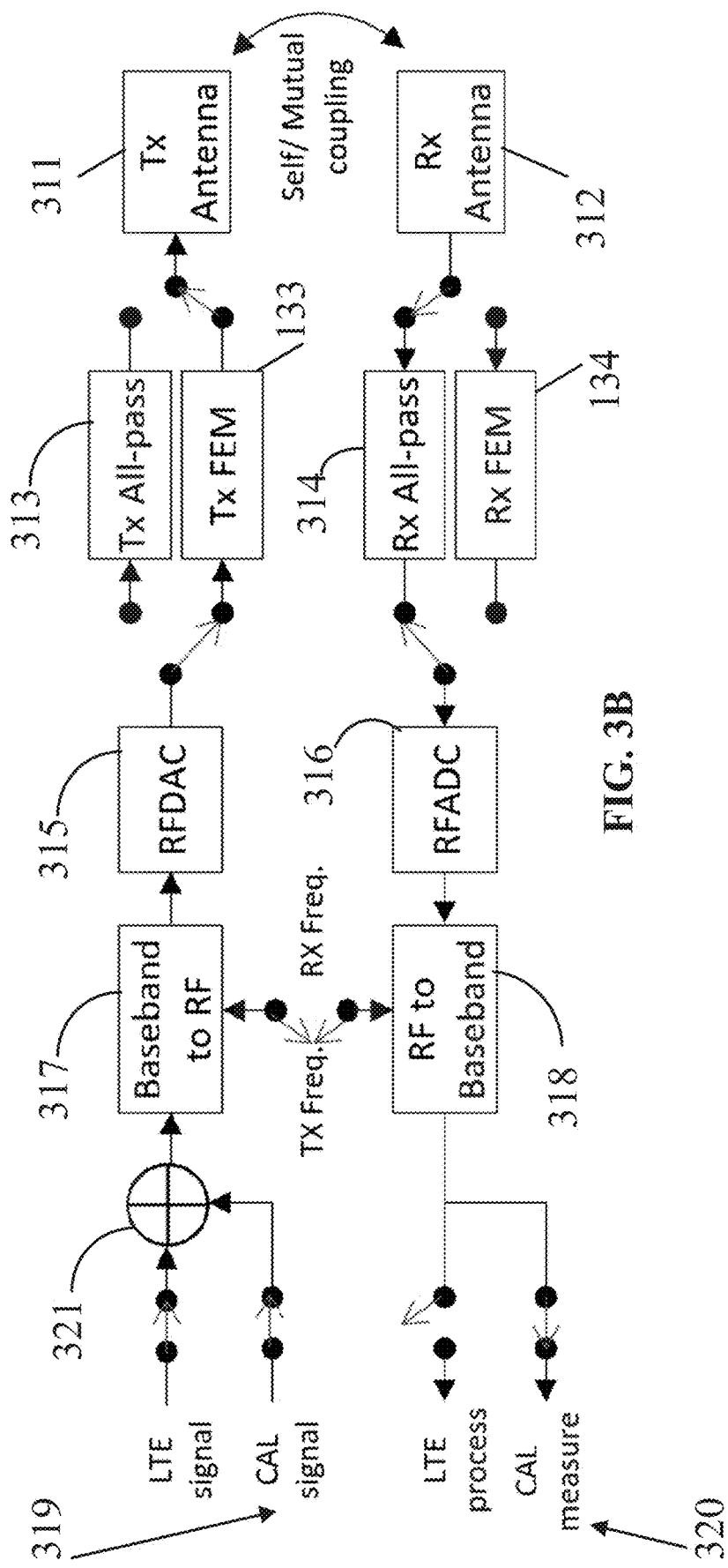
FIG. 3B illustrates an example configuration for Tx path calibration.
Figure 3C:
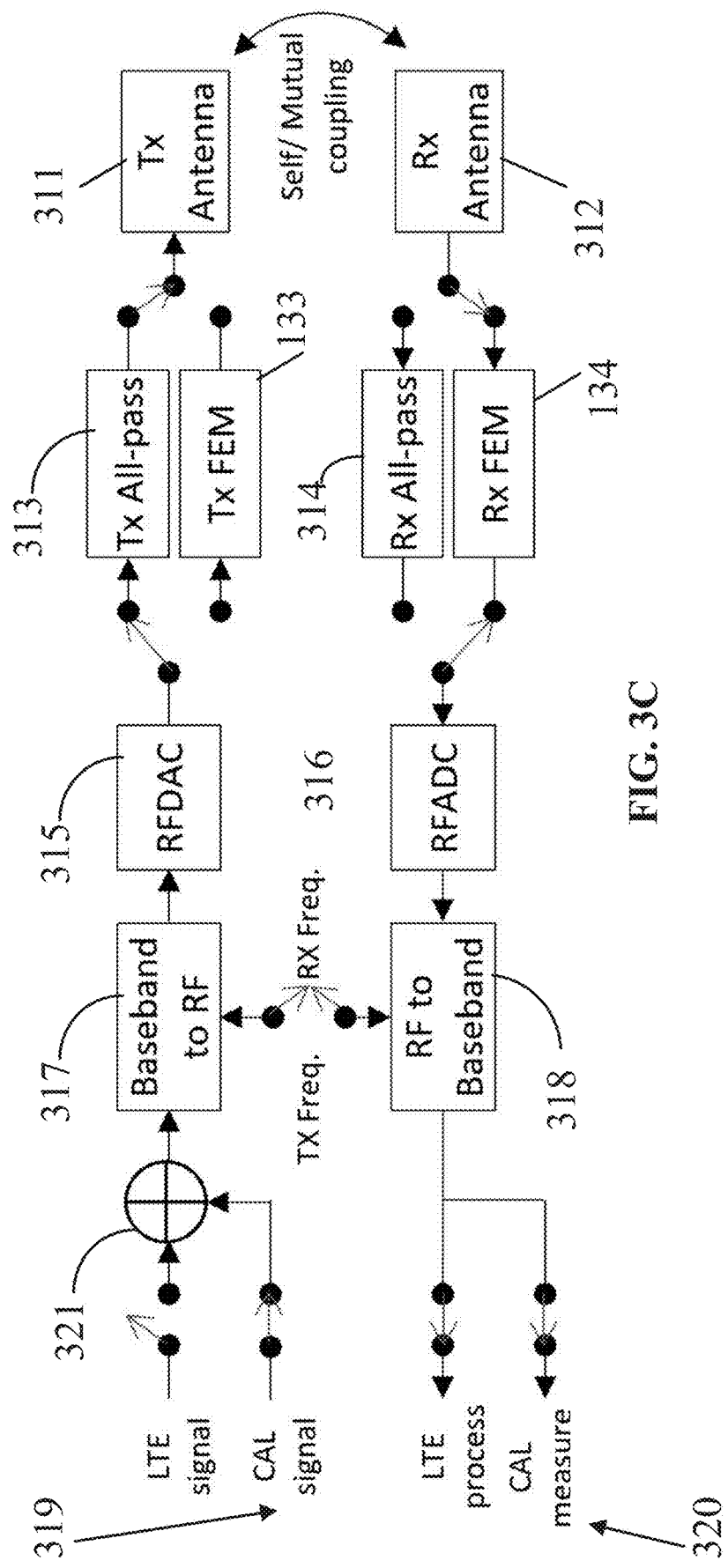
FIG. 3C illustrates an example configuration for Rx path calibration.

Examples configurations are shown by switch settings for different operating modes in FIG. 3A-3C. FIG. 3A shows transmit/receive (Tx/Rx) beamforming, which is the default mode of operation. Here, only Tx and Rx beamforming are done, and calibration measurements do not occur.

Referring to FIG. 3A, during the Tx/Rx beamforming, a beamformed signal, e.g., LTE signal, is provided to the baseband-to-RF NCO 317 via an adder circuit 321 without adding CAL signal 319, and the baseband-to-RF NCO 317 is tuned to the Tx Frequency. The baseband-to-RF NCO 317 converts the LTE signal and outputs a signal to a radio-frequency digital-to-analog converter (RFDAC) 315. The signal outputted from the baseband-to-RF NCO 317 is converted into an analog signal by the RFDAC 315. Tx FEM 133 is selected to pass the analog signal to the Tx Antenna 311. The Tx antenna 311 leaks into the analog signal to Rx antenna 312 (via self/mutual coupling), but is suppressed by the Rx FEM. The Rx antenna 312 may receive the analog signal. Rx FEM 134 is selected to pass the analog signal to a radio-frequency analog-to-digital converter (RFADC) 316. The RFADC 316 converts the analog signal into a digital signal. The digital signal is further provided to an RF-to-baseband NCO 318. The RF-to-baseband NCO 318 is tuned to Rx Frequency, and converts the inputted digital signal and output a signal for LTE process. Accordingly, the system is able to calibrate in FDD where the transmit and receive frequencies (and FEMs) are different.

FIG. 3B shows an example configuration for simultaneous Tx beamformer and Tx path calibration. In one example configuration, the calibration signal (CAL signal) 319 is introduced to characterize the element's Tx FEM's amplitude and phase response. The calibration signal may be a tone or a bi-phase (PN) sequence/Gold code. The calibration signal 319 is added to the beamformed signal (e.g., LTE signal) by the adder circuit 321; as a result, the output signal includes the transmit beamformed signal and the calibration signal. Tx FEM 133 is selected to allow transmit carrier frequency bands to be transmitted. Self and adjacent Tx paths, that require calibration, transmit calibration signal each with a different code. The Rx path of the element 5 central to the 9 elements (see, e.g., FIG. 2A), momentarily pause the Rx beamforming, switch from the Rx FEM 134 to Rx-all-pass path 314 (i.e., bypassing the Rx FEM 134), where Rx all-pass path 314 allows both transmit and receive carrier frequency bands to be received. The RF to baseband NCO 318 is tuned to the Tx Frequency such that calibration measurement 320 may be made for Tx calibration. In one example, 9 different codes (1 from self and 8 from adjacent elements) may be simultaneously used so that the transmit FEMs of the self and neighboring elements can be calibrated with respect to the same Rx all-pass path 314 of the central element, which is common reference for all these 9 measurements.

FIG. 3C shows, for RX FEM calibration, that the LTE signal from the DBF processor is temporarily (until this calibration measurement is completed) switched-off, the baseband-to-RF NCO 317 is tuned to the Rx frequency to allow calibration signal generation at Rx frequency, the Tx FEM 133 is bypassed by selecting the Tx-all-pass path 313, and the Rx FEM 134 is activated (as normal), and both Rx beamforming and the Rx calibration measurement 320 are enabled. The calibration signal 319 from the central element, such as element 5 in FIG. 2A, (with Tx FEM 133 bypassed) is received through the Rx FEMs 134 of the self and adjacent elements, so that the Rx FEMs 134 of the self and neighboring elements can be calibrated simultaneously with respect to the same Tx all-pass path 313 of the central element which is the common reference for all these 9 measurements. In one example, unlike the Tx FEM calibration case, Rx FEM calibration may use one calibration (tone or PN code) signal only.

According, Tx/Rx calibration can be achieved for FDD systems; up to 9 calibration sequences (per Micron) can be transmitted simultaneously in TXCAL mode, provided the cross-correlation of these codes are small, with 9 simultaneous correlations at one element; only one calibration sequence is need in Rx; however, the 9 correlators are implemented in different elements; the calibration sequences can have low power (relative to the beamforming signal) by increasing the length of the code; elements in different microns can have calibration measurements in parallel; in the case of 5, elements carrying calibration signals have to be pseudo-randomly selected to avoid sidelobes; and the codes themselves have to be phased differently in different Microns in order to avoid the calibration signal interfering with the beam signals.

Approaches to Determining Tx/Rx FEM Amplitude and Phase Responses

Approaches to determining Tx and Rx FEM attenuations and phase-shifts depend on whether the mutual coupling phases are assumed to be known or unknown.

Approach 1

In the first approach, for a given frequency, self and mutual couplings in the cardinal directions are assumed the same across the antenna assemblies of the array and with known values (that can be measured on the ground at room temperature and it is assumed that temperature fluctuations and aging in space do not materially change these values).

Figure 4:
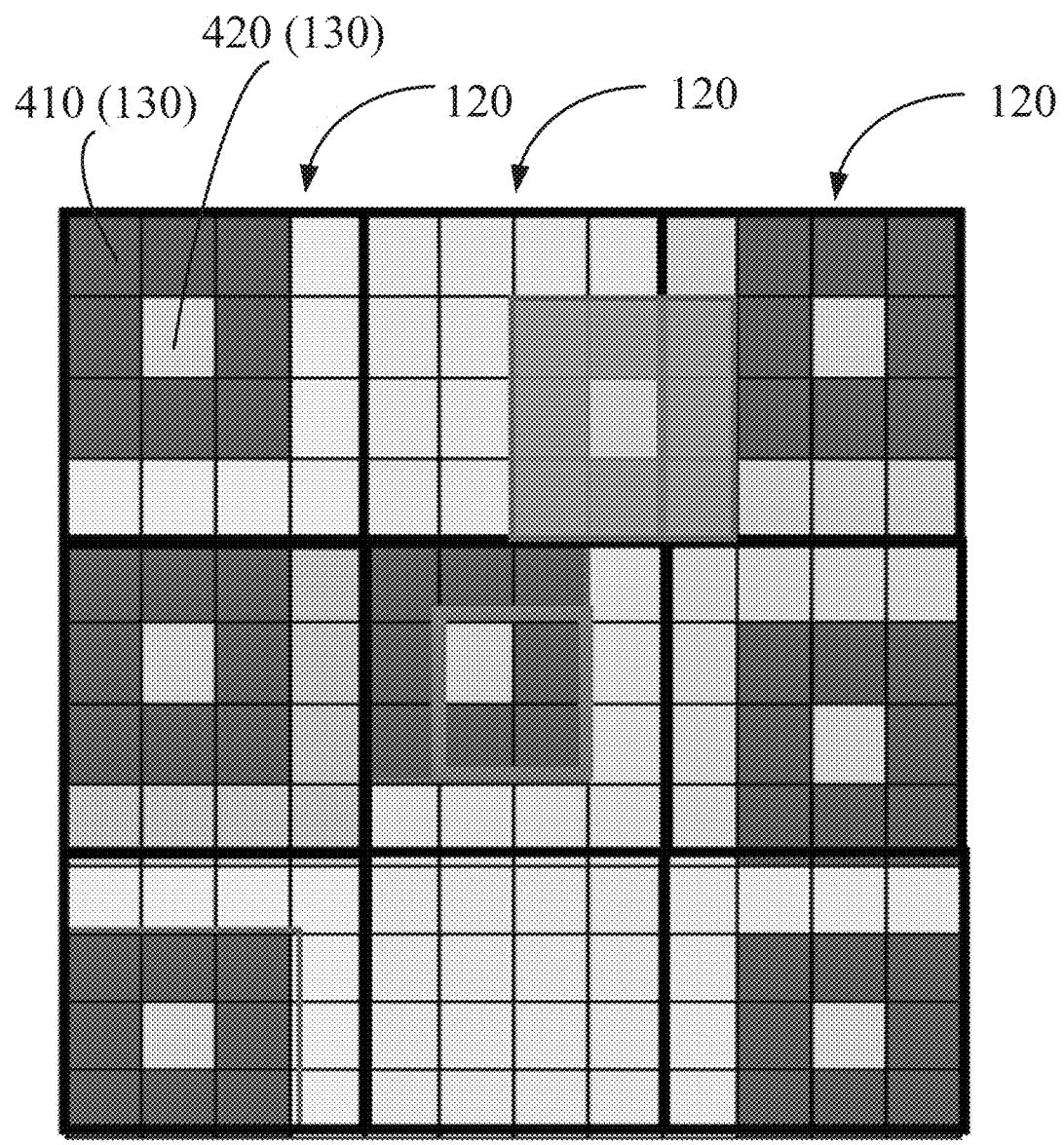
FIG. 4 illustrates an example configuration of elements in antenna assemblies during calibration.

FIG. 4 shows the example configurations for which the self and mutual coupling measurements are made on the ground and used on-board during calibration measurements. Referring to FIG. 4, 3×3 antenna assemblies 120 are shown, and each antenna assembly 120 may include a plurality of elements 130 (here, further designated as first and second elements, 410, 420). The second element 420 may be selected as a possible central element. Each antenna assembly 120 may include, for example, a group of 4×4 elements. Central elements in different antenna assemblies 120 can be calibrated in parallel (e.g., the term "parallel" as used throughout this disclosure includes simultaneous), provided they do not have neighboring antenna elements that are common. One way to ensure this is to calibrate alternate antenna assemblies (in checkerboard style in parallel).

Phase/logarithmic amplitude measurement is the sum of Tx path phase/logarithmic amplitude, the self/mutual coupling phase/logarithmic amplitude, and the Rx path phase/logarithmic amplitude. That is, phase measurement is sum of Tx path phase, the self/mutual coupling phase, and the Rx path phase; and logarithmic amplitude measurement is sum of Tx logarithmic amplitude, the self/mutual logarithmic amplitude, and the Rx path logarithmic amplitude.

Referring to FIG. 4, in transmit calibration, the first antenna element 410 is transmitting while the second antenna element 420 is the common Rx path (with all-pass path to allow CAL signal at transmit frequency to be received in Rx path). In receive calibration, element 410 is receiving while element 420 is the common Tx path (with all-pass path to allow CAL signal at receive frequency to be transmitted in Tx path). After all intra-antenna assembly calibration measurements are aligned, inter-antenna assembly measurements are reconciled.

Thus, FIG. 4 shows 9 antenna assemblies of 4×4 antenna elements. One snapshot of the antenna elements (the selected 9 out of 16) participating in the intra- and inter-Micron calibration measurements happening in each antenna assembly. The measurement is treated as intra-Micron if the selected 9 antenna elements are within the antenna assembly. The measurement is treated as inter-Micron if the selected 9 antenna elements spans 2 adjacent antenna. In each antenna assembly, while taking calibration measurements, one of the antenna elements acts as a central element 420 (common Rx path during transmit calibration and common Tx path during receive calibration), and all elements surrounding the central element 420 is treated as a second element 410 that surrounds the central element 420. Once the measurements of the 9 elements is taken with reference to the common path, it is moved to a different position until the measurements of all antenna elements are covered. In the embodiment shown, the middle bottom set is not making any calibration measurements at that particular instant. In the top middle, some of the surrounding elements 410 extend into the next set (to the right in the embodiment shown), which reflects an inter-Micron measurement, to align the measurements of one antenna assembly with the measurements of the adjacent antenna assembly. Thus, the system obtains calibration measurements from multiple elements simultaneously.

Approach 1: Tx Calibration Procedure

Figure 5:
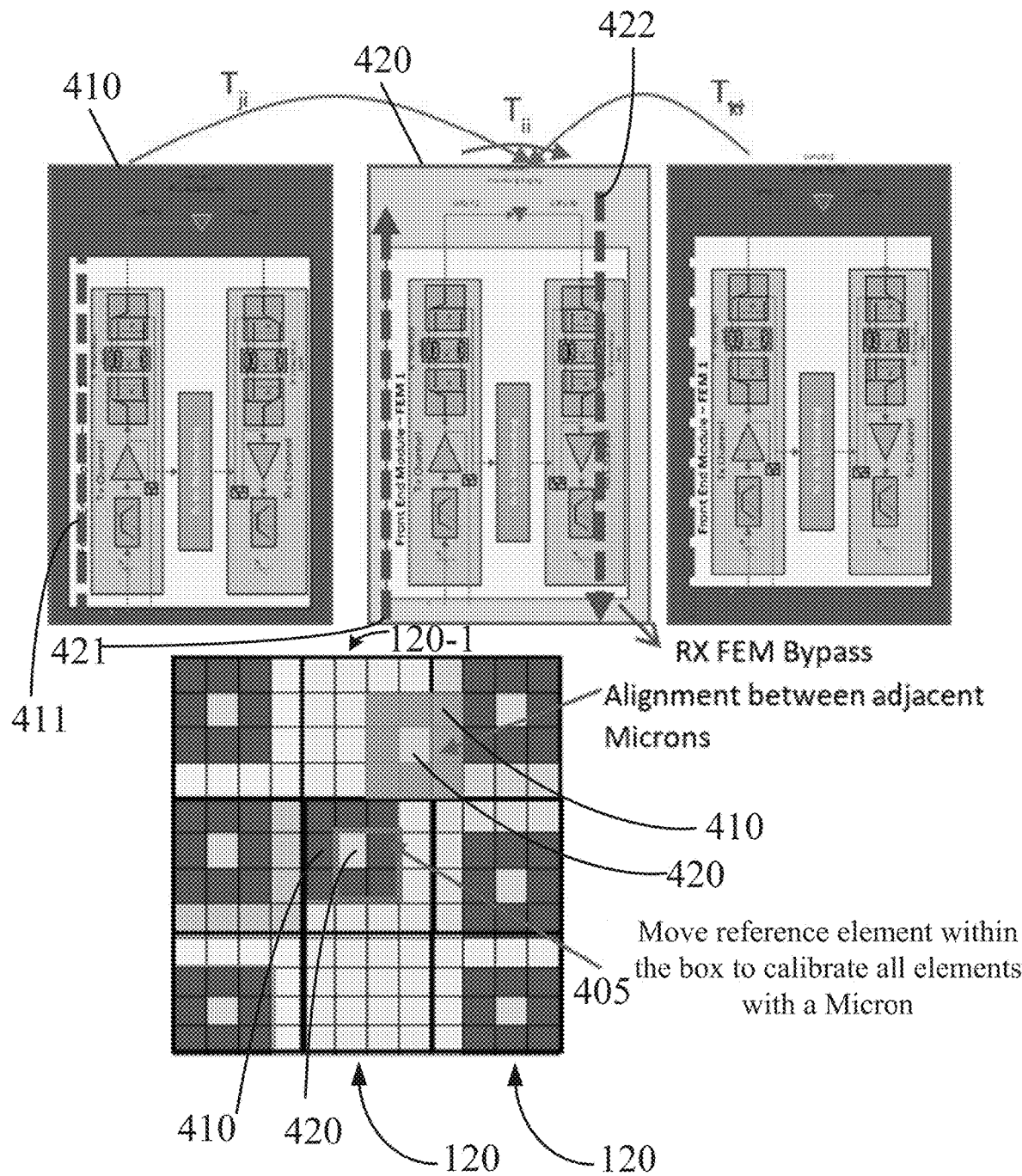
FIG. 5 illustrates an example FEM configuration during Tx calibration.

FIG. 5 shows the FEM configurations during Tx calibration. The antenna assembly measures combined phase/amplitude (e.g., the sum of the phases of the Tx FEM, the self/mutual coupling and the all-pass Rx and the sum of log amplitude of the Tx FEM, the self/mutual coupling, and the all-pass Rx) in the reference Rx path of the reference element 420 when self and surrounding 8 elements 410 transmits the calibration signal sequentially or in parallel (See, e.g., 141 in FIG. 14). In one example, what code is transmitted by each neighbor (and self) may be determined for the measurements, and this information may be coordinated/communicated by the central processor.

Each measurement includes different transmit paths, different, but known, mutual couplings and a common receive path. Therefore, we can compute the contribution of the different transmit phase/amplitude contributions, added to the common receive path's amplitude and phase, by subtracting out the known mutual couplings. The differential phase/amplitude between each Tx path 411 of the current neighboring element 410 and the Tx path 421 of the selected reference element 420 may be calculated, for example, according to combined phase/amplitude of the measurements, as the Rx path 422 is common, having same phase/amplitude contribution. The same contribution of the Rx path 422 may be removed by calculating the differences between combined phase/amplitude of the measurements. (142 in FIG. 14). The common Rx path 422 is further removed by a rationalization process, whereby there is a common receive path (which is unknown) and many transmit paths. Thus, when we subtract one measurement from the other (after subtracting the known mutual coupling phase), the common receive phase is eliminated and we're left with differential measurements, i.e. the difference between one transmit path and another. This is what we mean by differential measurements. And vice versa when there's a common transmit and multiple receive paths, we get differential between various receivers.

Adjust each element Tx path phase/amplitude to align with the reference element. That is, adjust each element Tx path phase/amplitude to align with the Tx path phase/amplitude of the reference element (143 in FIG. 14).

Make successive center 2×2 elements in the box 405 as the reference element and repeat processes for the combined measurements described above.

Repeat the process for each antenna assembly 120, e.g., in parallel, until alignment of all individual elements within an antenna assembly and all antenna assemblies in the phased array antenna are completed, respectively.

Inter-Antenna Assembly

In the following, "inter-antenna assembly" implies across antenna assemblies and "inter-antenna assembly measurements" mean measurements across antenna assembly boundaries. These inter-antenna assembly measurements may be performed to, for example, a) align the phase and amplitude of all antenna assemblies in the phased-array to a common reference (say, a central element of the antenna array) so that the array may act in unison in forming beams; and b) recover an unknown carrier phase between antenna assemblies (since the carrier phase upon power-up is independent and random from antenna assembly-to-antenna assembly).

Figure 15:
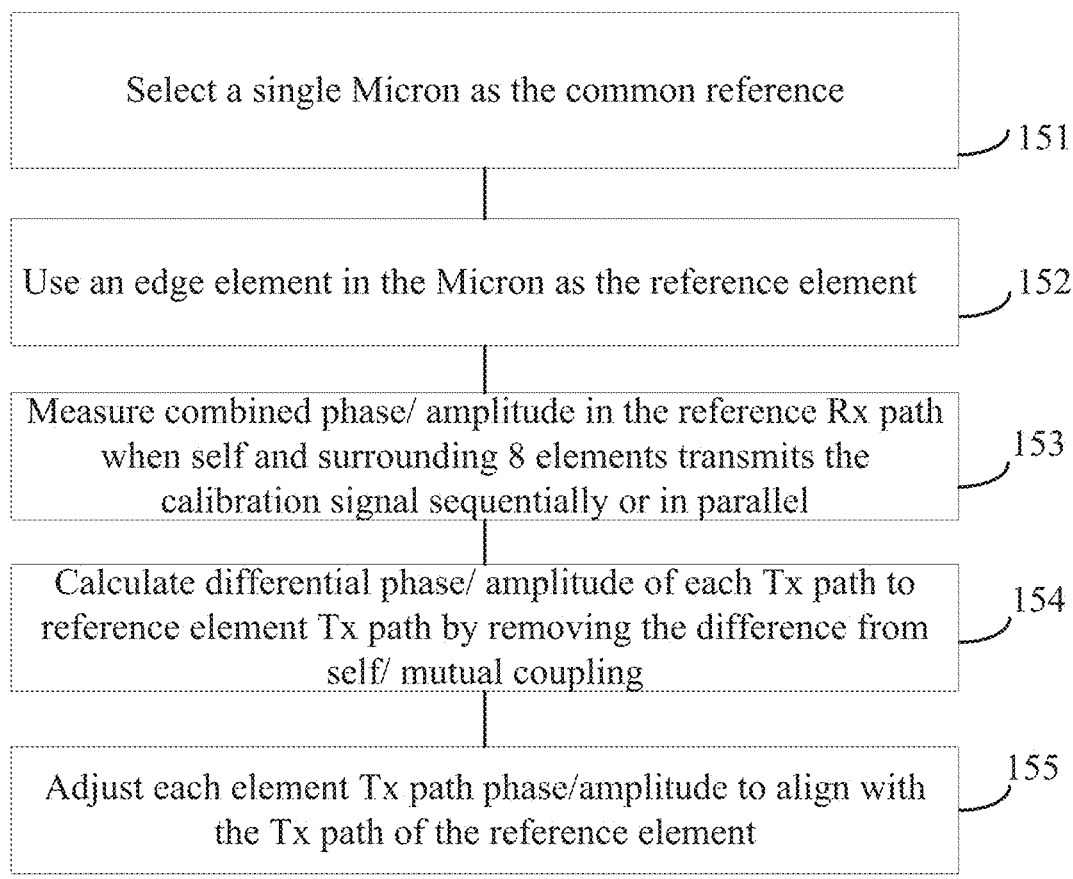

Select a single antenna assembly as the common reference (151 in FIG. 15). For example, referring to FIG. 5, antenna assembly 120-1, which is an example of antenna assemblies 120, may be selected as the common reference.

Use an edge element in the antenna assembly as the reference element (152 in FIG. 15). Self and mutual measurements are taken with a receive element at the edge of an antenna assembly (as described above). That is, the central element (which is at the edge of an antenna assembly) measures combined phase/amplitude in the reference Rx path of the reference element 420 (i.e., the central element) when self and surrounding 8 elements 410 transmits the calibration signal sequentially or in parallel (153 in FIG. 15). For example, combined phase/amplitude may be measured in the reference Rx path of the reference element 420 of the antenna assembly 120-1 when self and surrounding 8 elements 410 transmits the calibration signal sequentially or in parallel (e.g., simultaneously).

Figure 14:
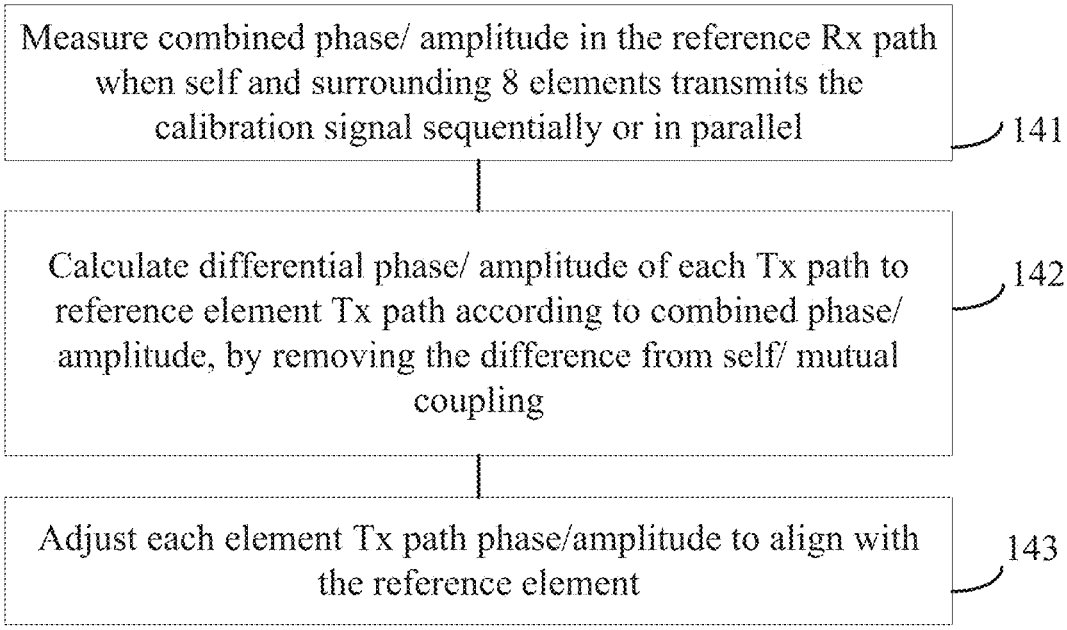

Calculate the differential phase/amplitude between each Tx path 411 of the current neighboring element 410 and the Tx path 421 of the selected reference element 420, e.g., by subtracting, for example, according to combined phase/amplitude, as Rx path 422 is a common additive component in all measurements (154 in FIG. 14). The difference from self/mutual coupling (such as difference between mutual coupling $T_{ji}$ and self-coupling $T_{ii}$), may be removed.

Adjust each element Tx path phase/amplitude to align with the reference element. That is, adjust each element Tx path phase/amplitude to align with the Tx path of the reference element (155 in FIG. 15).

For example, a 4×4 antenna assembly contains 16 elements of which 12 are edge elements. Repeat the same process by making all the edge elements in the selected antenna assembly also as reference, respectively. For example, in the selected antenna assembly 120-1, sequentially select another edge element as a reference element, and repeat the above-described processes.

The phase differences from one antenna assembly to adjacent antenna assembly have an added term (to the sum of Tx FEM phase, the mutual coupling phase, and the bypass Rx central element) and that is the carrier phase difference between one antenna assembly and its neighbor antenna assembly.

These various differences are communicated to the central processor and reconciled (to a common reference, e.g., an element at the center of the phased-array) at central processor (as described later) and communicated back to the antenna assemblies so that they can act in unison to form beams in various directions.

Figure 6:
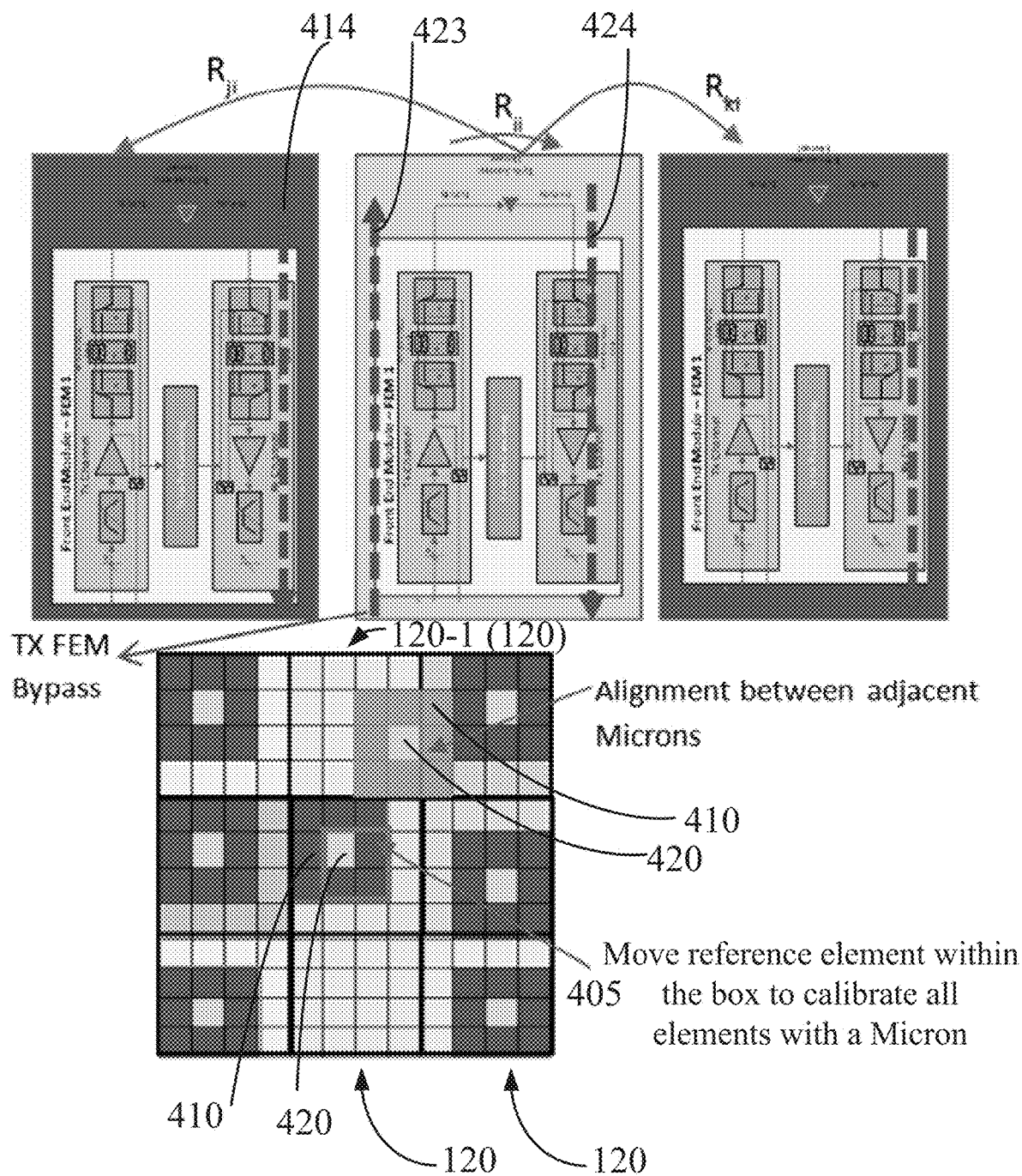
FIG. 6 illustrates an example FEM configuration during Rx calibration.

Approach 1: Rx Calibration Procedure:

FIG. 6. Shows FEM configuration during Rx calibration

Intra-Antenna Assembly:

Referring to FIG. 6, antenna assembly measures combined phase/amplitude from the Rx path (e.g., 414, 424) of self and directly surrounding or neighboring 8 elements when the reference element 420 transmits the same calibration signal to them. That is, antenna assembly measures combined phase/amplitude, where each combined phase/amplitude includes contributions from a corresponding Rx path of that self element 420 and surrounding 8 elements 410 when the reference element transmits the calibration signal. (See, 161 in FIG. 16).

Figure 16:
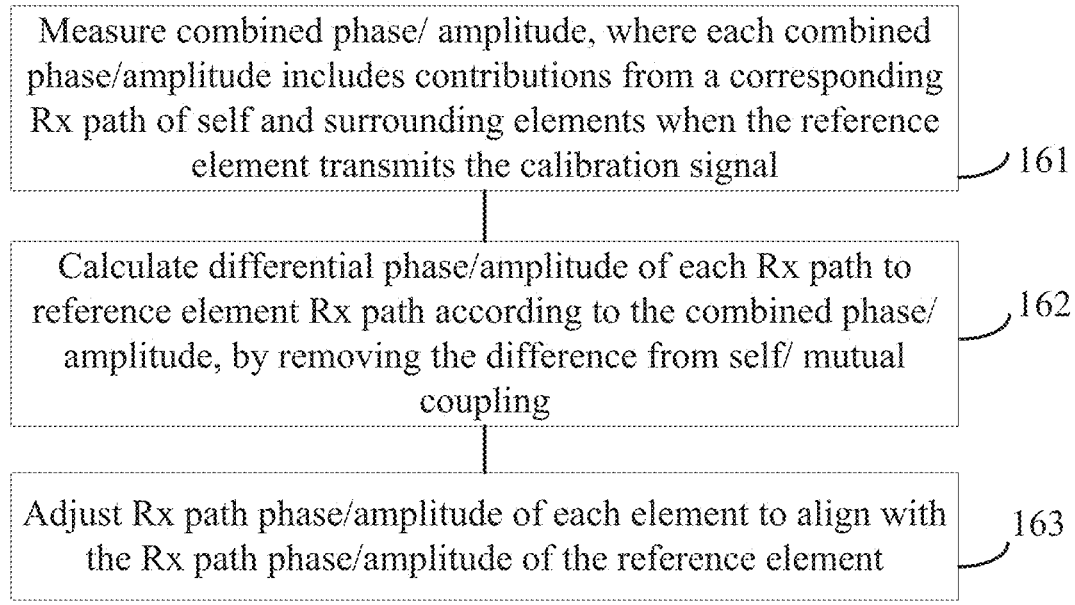

Calculate differential phase/amplitude of each Rx path 414 to reference element Rx path 424 according to the combined phase/amplitude, by removing the difference from self/mutual coupling (such as difference between mutual coupling $R_{ji}$ and self-coupling $R_{ii}$), as Tx path 423 is common, having same impact (162 in FIG. 16).

Adjust each element Rx path phase/amplitude to align with the reference element. That is, adjust Rx path phase/amplitude of each element to align with the Rx path phase/amplitude of the reference element (163 in FIG. 16).

Repeat the same process by making other elements within the center 2×2 elements in the box 405 as a reference element, respectively, to calibrate each of the directly neighboring elements by adjusting each neighboring element Rx path phase/amplitude to align with the reference element 420. For example, select another element within the box 405 as a reference element, and repeat the above-described processes.

Figure 17:
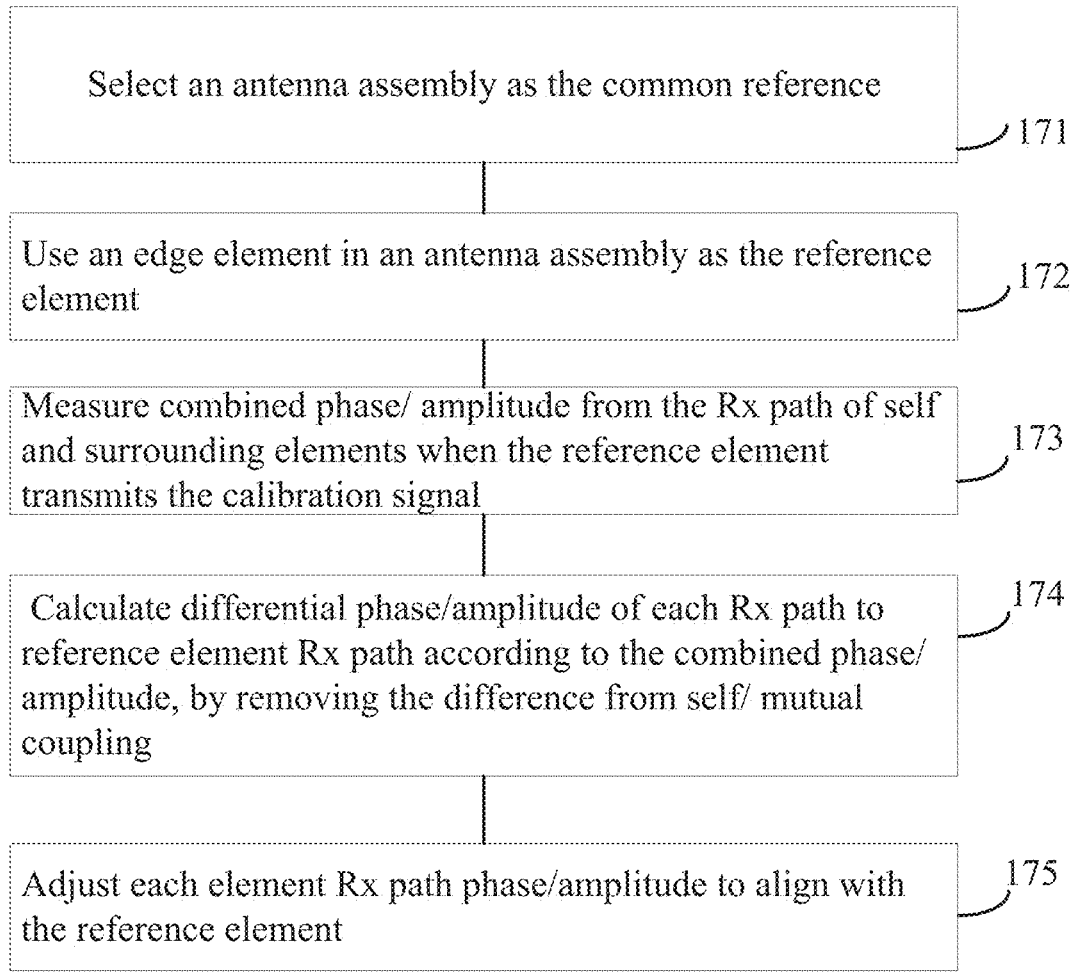

Repeat the process for each antenna assembly 120, e.g., in parallel (e.g., simultaneously), until alignment of all individual elements within an antenna assembly and all antenna assemblies in the phased array antenna are completed, respectively Inter-Antenna Assembly:

Select a single antenna assembly as the common reference (171 in FIG. 17). For example, referring to FIG. 6, antenna assembly 120-1, which is an example of antenna assemblies 120, may be selected as the common reference.

Use an edge element in an antenna assembly as the reference element (172 in FIG. 17). Similar processes may be repeated, which are described as follows. To repeat the chosen example, a 4×4 antenna assembly contains 16 elements of which 12 are edge elements. We repeat the same process by making all the edge elements in the selected antenna assembly also as reference, respectively. For example, in the selected antenna assembly 120-1, sequentially select another edge element as a reference element, and repeat this for every antenna assembly edge element.

The antenna assembly measures combined phase/amplitude from the Rx path (e.g., 414, 424) of self (i.e., the reference element 420 itself) and surrounding 8 elements when the reference element 420 in the selected antenna assembly 120-1 transmits the calibration signal. That is, antenna assembly measures combined phase/amplitude, where each combined phase/amplitude includes contributions from a corresponding Rx path of the reference element 420 itself and surrounding 8 elements 410 when the reference element 420 in the selected antenna assembly 120-1 transmits the calibration signal. (See, 173 in FIG. 17). In particular, the phase differences from one antenna assembly to adjacent antenna assembly have an added term (to the bypass Tx central FEM phase, the mutual coupling phase and the neighbor Rx element) and that is the carrier phase difference between one antenna assembly and its neighbor antenna assembly.

Calculate differential phase/amplitude of each Rx path 414 to reference element Rx path 424 according to the combined phase/amplitude, by removing the difference from self/mutual coupling (such as difference between mutual coupling $R_{ji}$ and self-coupling $R_{ii}$), as Tx path 423 is common, having same impact (174 in FIG. 17).

Adjust each element Rx path phase/amplitude to align with the reference element. That is, adjust Rx path phase/amplitude of each element to align with the Rx path phase/amplitude of the reference element (175 in FIG. 17).

Repeat the same process by making other edge elements in the selected antenna assembly also as reference, respectively. For example, in the selected antenna assembly 120-1, sequentially select another edge element as a reference element, and repeat the above-described processes for all edge elements. If the antenna assembly is at the edge of the array, we may only take interior neighbor elements.

These differences are reconciled at central processor and corrected at each antenna assembly.

The two carrier phase differences from Tx and Rx calibration measurements can be averaged.

Approach 2:

In the second approach, self and mutual couplings in the cardinal directions are assumed to be the same within an antenna assembly (i.e., the intra-antenna assembly mutual couplings) and with unknown values within a range from nominal values. Further, the inter-antenna assembly mutual couplings in cardinal directions are assumed to be the same in the interior of an edge, but different near antenna assembly corners. The two approaches have various aspects (with respect to each other) which are detailed after the ensuing description of them (in Table 4).

We consider the calibration that occurs within an antenna assembly (the right part of FIG. 7, called intra-antenna assembly calibration), that recovers, in that particular example, 16 transmit and 16 receive FEM phases, 8 mutual coupling phases 701 to 708 (that are translation, but not rotation, invariant) as well as 1 self-coupling phase from overall loop-back (through mutual/self-coupling) phase measurements (in this case, 100) using an injected reference signal. We later consider recovery of an adjacent antenna assembly's single row or column elements' 10 mutual coupling phases 709 to 718 (which could be different from intra-antenna assembly mutual coupling phases in the same direction) and one carrier phase from 20 overall loop-back phase measurements (assuming 8 transmit and receive phases are known from intra-antenna assembly measurements). Thus, for an n×n square (for example) array of antenna assemblies approximately $120n^2$ phase measurements need to be performed. For quick array calibration, antenna assemblies are calibrated in parallel (e.g., simultaneously).

Figure 7:
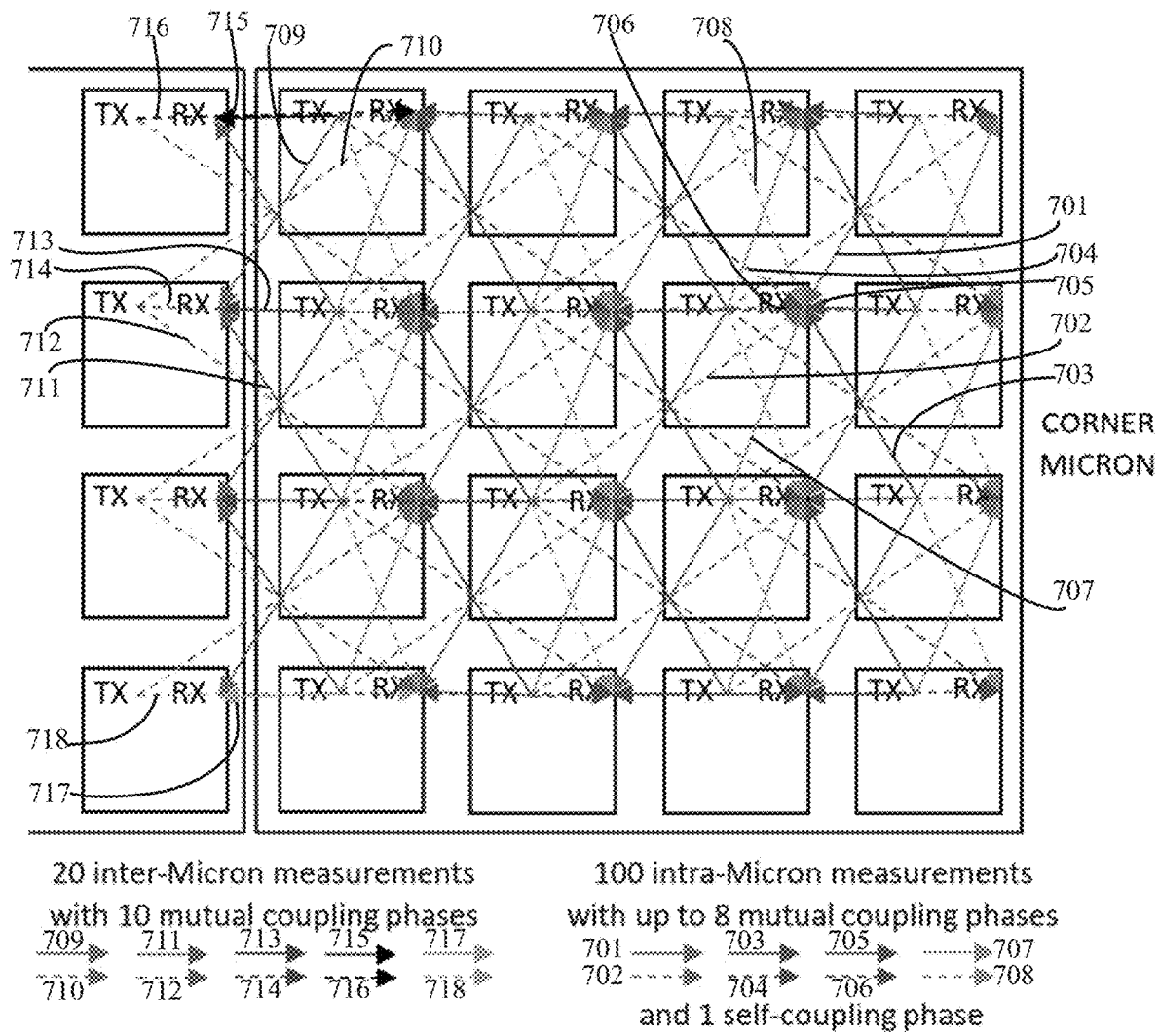
FIG. 7 illustrates intra- and inter-antenna assembly differential phase measurements.

From the antenna assembly's coupling graph of FIG. 7, Tx to Rx phase measurements are:

TABLE 2

| Breakup of Approach 2 measurements | |
| --- | --- |
| Inter-antenna assembly | Intra-antenna assembly |
| $\phi_{TXFEMi} + \phi_{Mk} + \phi_C + \phi_{RXFEMj}$ where i, j, k are integers $1 \le i, j \le 8, i \ne j, 1 \le k \le 10$ Total measurements = 20 8 known FEM phases 10 unknown mutual coupling phases 1 unknown carrier phase 11 total unknown phases Rank of incidence matrix is 11 | $\phi_{TXFEMi} + \phi_{Mk} + \phi_{RXFEMj}$ where i, j, k are integers $1 \le i, j \le 16$, such that no crossings of elements in path, $i \ne j, 1 \le k \le 8$ for measurement with mutual-coupling $i = j, k = 9$ for measurement with self-coupling Total measurements = 100 32 unknown FEM phases Up to 8 unknown mutual coupling phases 1 unknown self-coupling phase Up to 41 total unknown phases Rank of incidence matrix is up to 41 |

Ax=b, A is sparse and is a matrix with 1s and 0s. For example, consider 100 equations with 41 unknowns:

$$\underset{unknowns}{\underbrace{[A]}_{100\times 41}} \cdot \underbrace{[x]}_{41\times 1} = \underbrace{[b]}_{100\times 1} \nearrow^{measurements}$$

In each row of the incidence matrix A, only 3 entries are 1, rest are 0. Total of 300 ones in matrix, remaining 3800 entries are zero.

Figure 8:
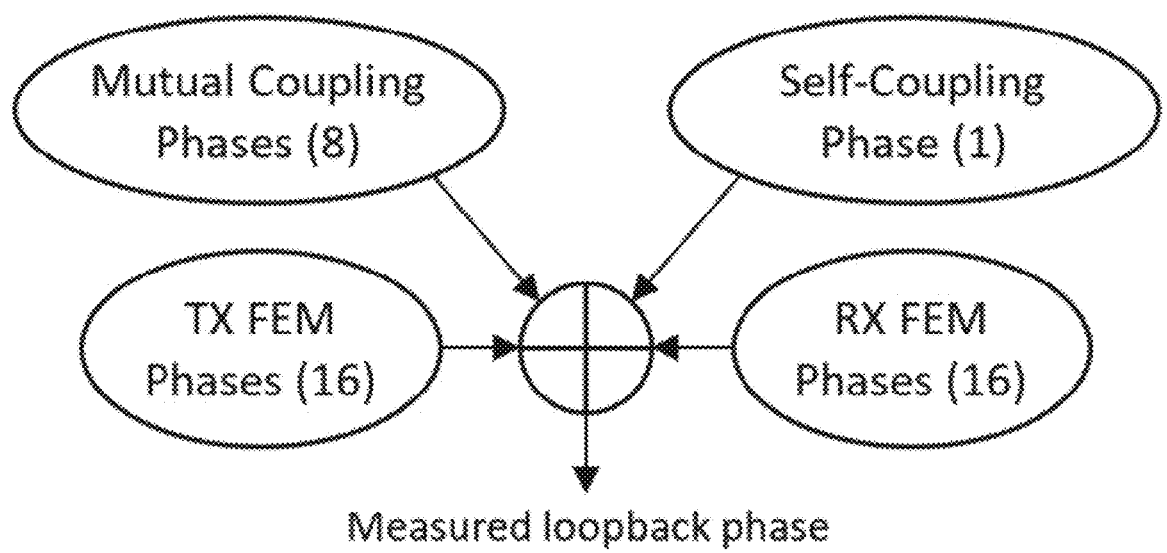
FIG. 8 illustrates phase measurement from intra-antenna assembly incidence matrix.

Since the graph of FIG. 8 is connected, A has rank equal to the number of unknowns and $A^T A$ has integer entries and is also invertible. For example, if a graph is disconnected and consists of two components $G_1$ and $G_2$, the incidence matrix A(G) of graph G can be written in a block diagonal form as $$A(G) = \begin{bmatrix} A(G_1) & 0 \\ 0 & A(G_2) \end{bmatrix},$$

where $A(G_1)$ and $A(G_2)$ are the incidence matrices of components $G_1$ and $G_2$. No edge in $G_1$ is incident on vertices of $G_2$ and vice versa. This extends for a disconnected graph with any number of components. This implies $A^T A X = A^T b \Rightarrow X = [A^T A]^{-1} A^T b$ which is the direct solution to normal equations. Since $(A^T A)$ is ill-conditioned, with a high eigenvalue spread, it cannot conventionally be inverted. We look for an iterative solution. $X = [I - A^T A] X + A^T b$ This gives rise to the "fixed-point" iterative solution $X^{k+1} = [I - A^T A] X^k + A^T b$ Convergence depends on low spectral radius of $[I-A^TA]$, which is large. We therefore define a pre-conditioner matrix P, so that $P^{-1} \approx [I-A^TA]^{-1}$. For example, as $A^TA$ is positive definite, a pre-conditioned conjugate gradient solver may be used.

Then, normal equations become: $P^{-1}A^TAX^* = P^{-1}A^Tb$
$X^{k+1} = [I-P^{-1}A^TA]X^k + P^{-1}A^Tb$ or $PX^{k+1} = [P-A^TA]X^k + A^Tb$
Define $r^k = A^Tb - A^TAX^k$ (residual vector); then, $PX^{k+1} = PX^k + r^k$ or $X^{k+1} = X^k + P^{-1}r^k$ Iterations converge quickly if $X^k$ is a good guess (which we obtain nominally from a finite element solver for electromagnetic structures such as HFSS). We assume that the transmit FEM phase shifts, the mutual coupling phase shifts and the receive FEM phase shifts are each less than $2\pi/3$.

Inter-Antenna Assembly Equation:

$$\underset{\substack{\text{unknowns}}}{\underbrace{[A]}_{20\times11} \cdot \underbrace{[x]}_{11\times1}} = \underbrace{\begin{bmatrix} b - \text{known} \end{bmatrix}}_{\substack{20\times1 \\ \text{measurements}}}$$

Figure 9:
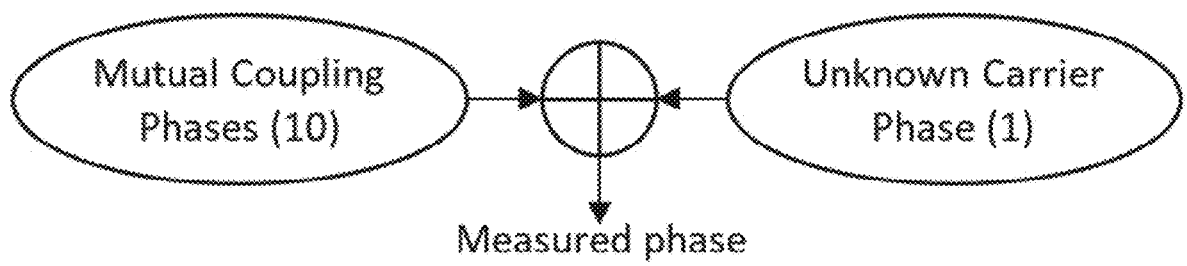
FIG. 9 illustrates Phase measurement from inter-antenna assembly incidence matrix with known FEM phases.

In each row of the incidence matrix A (for 20 equations with 11 unknowns), only 2 entries are non-zero, rest are 0. Total of 30 one's and 10 minus-one's in matrix, remaining 180 entries are zero. Only the neighbor antenna assembly's 10 mutual coupling phases (the intra- and inter-antenna assembly mutual coupling phases are assumed, in general, to be different) and a carrier phase are unknown. The known TXFEM and RXFEM phases (obtained from intra-antenna assembly measurements) involved with the selected row are subtracted from the measured loop-back phase to provide the corresponding RHS in the above equation. The graph corresponding to FIG. 8 for inter-antenna assembly phase calibration is shown in FIG. 9.

Figure 10:
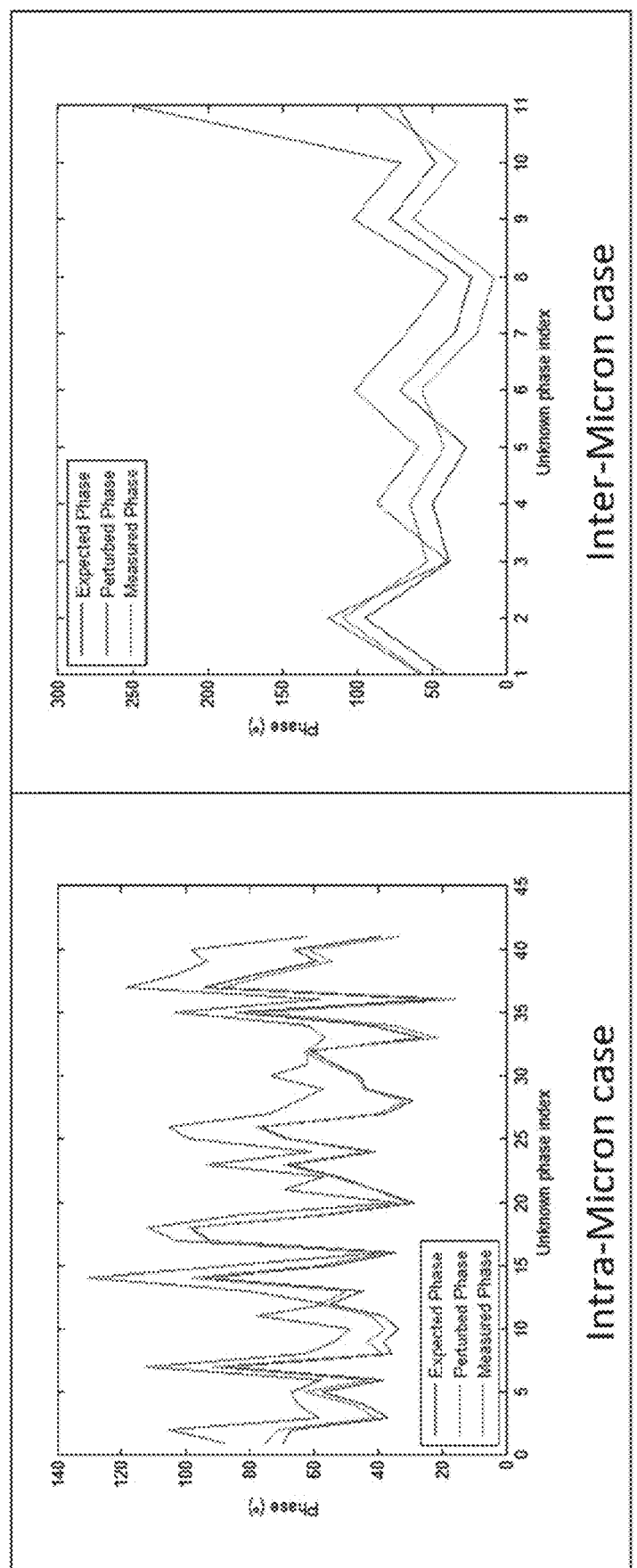
FIG. 10 illustrates expected vs measured phase error for up to 40° perturbation from nominal values.

Approach 2 measurements: For Ax=b, A is sparse matrix generated using the procedure discussed above. Initially, x is chosen to be a random vector of 41 random phase values (for intra-antenna assembly case) and 11 random phase values (for inter-antenna assembly case). Then, b is determined using the above equation. Now, x is perturbed with a random phase error ($\Delta x$). Pre-conditioned conjugate gradient (PCG) method is used to recover x from x+$\Delta x$, where pcg MATLAB function may be used for simulation, syntax: X=pcg (A,B,TOL,MAXIT,M1,M2,X0). $\Delta x$ can be up to ±180 for carrier phase. For example, pcg MATLAB function may be used for simulation, syntax: X=pcg(A,B,TOL,MAXIT,M1, M2,X0). Table 3 tabulates the number of iterations and the measured phase error versus the introduced phase error for intra-antenna assembly case. Initial, final and expected values are shown in FIG. 10 for both intra- and inter-antenna assembly cases.

TABLE 3

Approach 2 simulation measurements

| Introduced phase error (°) | PCG iterations | Maximum residual phase error (°) |
|---|---|---|
| 0-5 | 21 | ±1.5 |
| 0-10 | 21 | ±2 |
| 0-20 | 22 | ±5 |
| 0-40 | 22 | ±10 |
| 0-60 | 23 | ±15 |

TABLE 4

Aspects of two approaches

| | Approach 1 | Approach 2 |
|---|---|---|
| Stability/ repeatabty of mutual coupling values | Assumed, with respect to intra- and inter- Microns as well as over temperature and aging | Not assumed |
| Calculated accuracy of FEM phases from measurements | Good | Moderate (although equations have full rank, they are ill-conditioned, requiring an iterative solver) |
| Error Propagation over array | Errors for Tx and Rx FEM phases and carrier phase propagate | Only carrier phase errors propagate |

Measurement Steps (Common to Both Approaches):

We now describe example steps/processes for calibrating an antenna assembly array.

Figure 11:
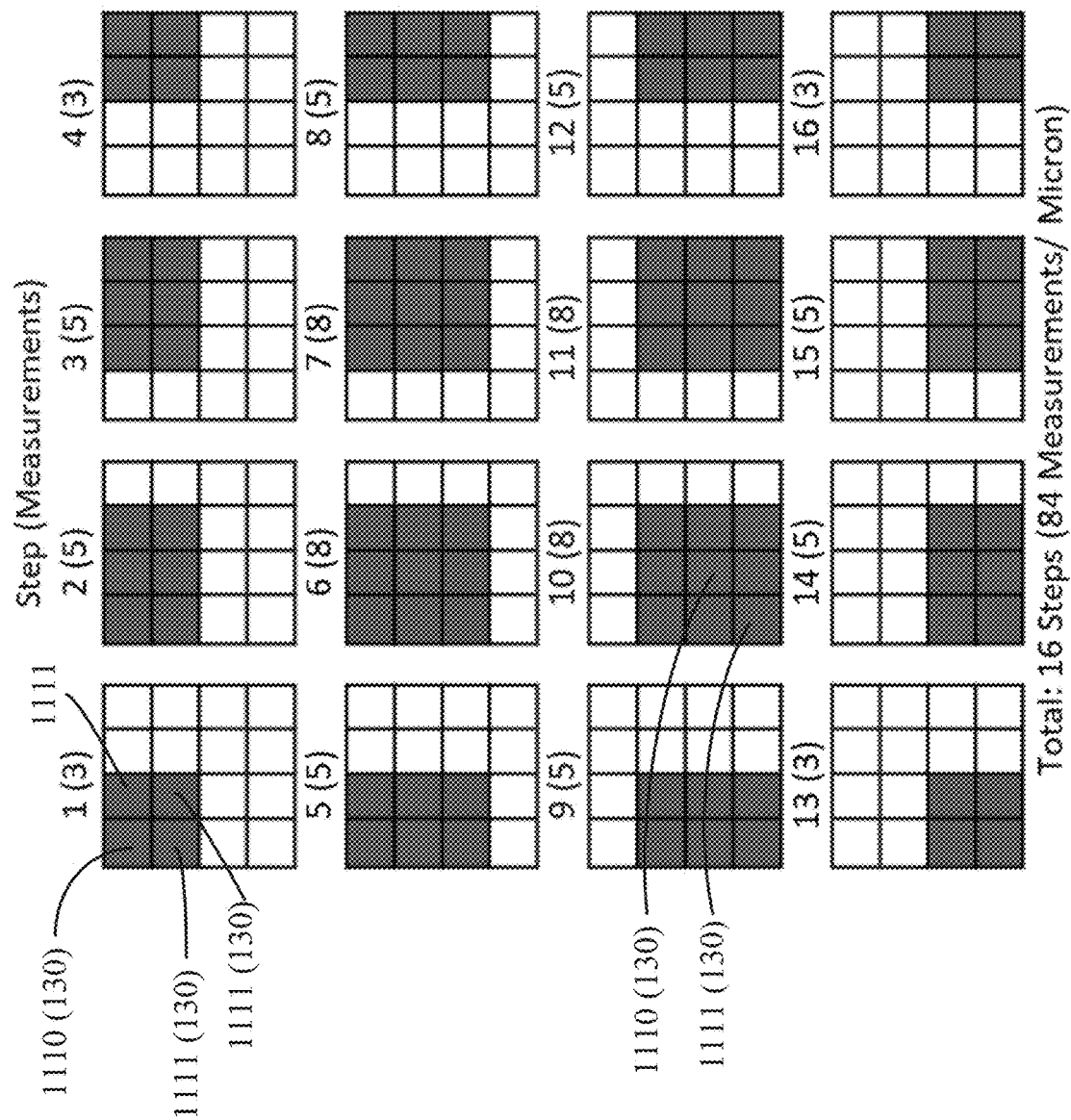
FIG. 11 illustrates example number of steps (and measurements) for intra-antenna assembly calibration.

In the intra-antenna assembly case, FIG. 11, where an element 1110, which may server as, for example, a transmit element, and elements 1111, which are adjacent neighbors of the element 1110 and may serve as, for example, receive elements are indicated, shows how measurements can be made across the entire antenna assembly array. The adjacent neighbors of the element 1110 may include diagonal neighbors of the element 1110. Elements 1110 and 1111 can also be collectively referred to as elements 130.

Sequentially transmit from each element and take measurements at all adjacent Receive elements. That is, in an antenna assembly, transmit from an element (i.e., an element in an antenna assembly) and take measurements at all adjacent Receive elements around the element (181 in FIG. 18). Further, in the element, transmit from another element and take measurements at all adjacent Receive elements around the element (182 in FIG. 18). Repeat such process until each element in the antenna assembly is selected as an element to transmit from, and measurements at all adjacent Receive elements adjacent to the corresponding element are taken.

In one example, each of these 16 patterns (FIG. 11) can be done simultaneously across the antenna assembly array, so that entire antenna assembly array (for intra-antenna assembly calibration) can be measured in 16 sequential steps. In another example, some or all of these 16 patterns can be done across the antenna assembly array at different time.

Figure 12:
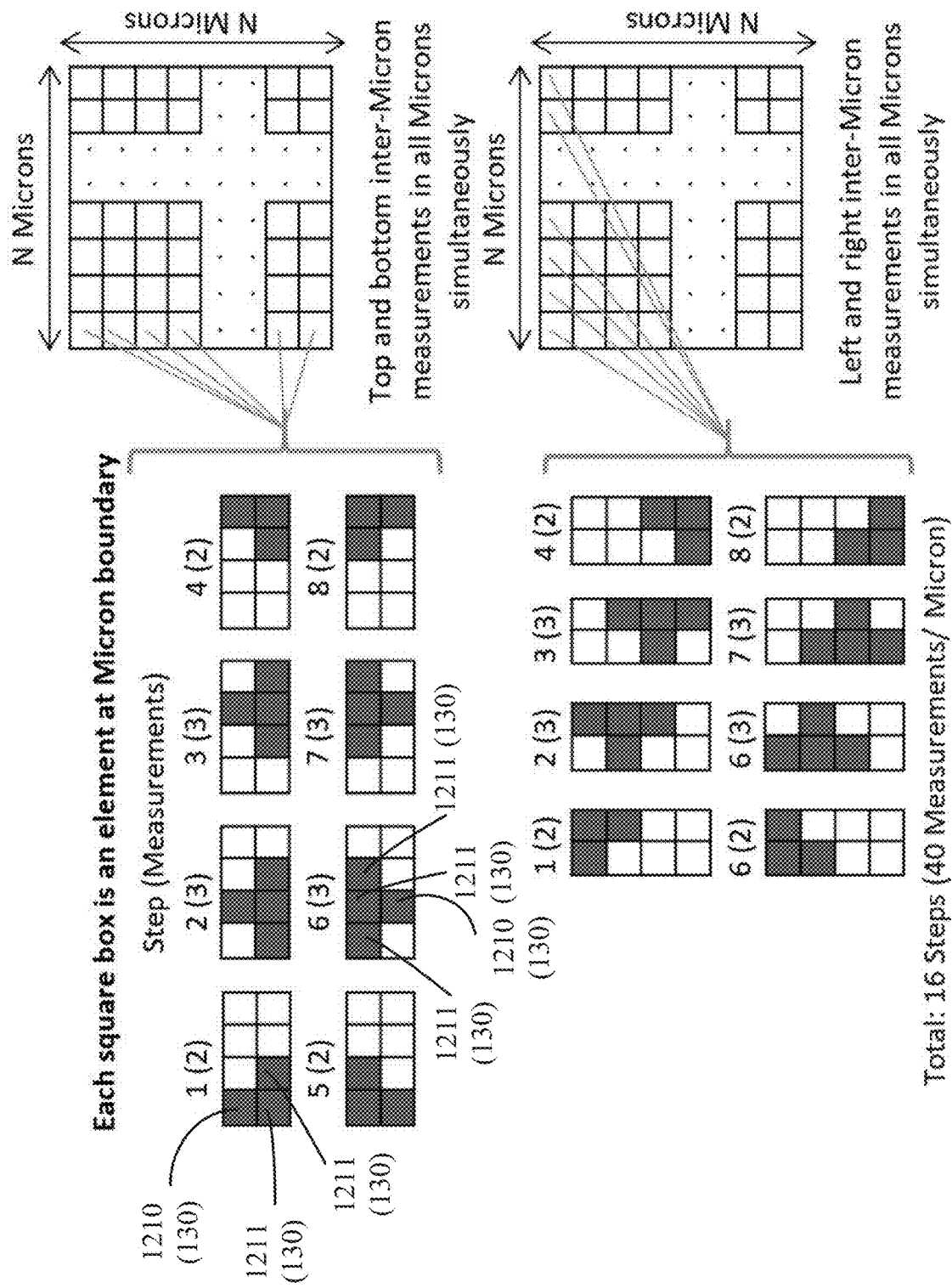
FIG. 12 illustrates Number of steps (and measurements) for inter-antenna assembly calibration.

For the inter-antenna assembly case, FIG. 12 illustrates how inter-antenna assembly measurements can be made across the entire antenna assembly array. Referring to FIG. 12, an element 1210 may server as, for example, a transmit element, and elements 1211, which are adjacent neighbors of element 1210 and in an adjacent antenna assembly, may serve as receive elements. The adjacent neighbors of element 1210 and in the adjacent antenna assembly may include diagonal neighbors of element 1210 and in the adjacent antenna assembly.

Similar to the above-described processes, transmit from each element 1210 at an inter-antenna assembly boundary and take measurements at all adjacent receive elements 1211 (sequentially). That is, transmit from an element 1210 at inter-antenna assembly boundary and take measurements at all adjacent receive elements 1211 (191 in FIG. 19). Further, transmit from another element 1210 at inter-antenna assembly boundary and take measurements at all adjacent receive elements 1211 (192 in FIG. 19). Repeat such process until each element at the inter-antenna assembly boundary is selected as an element to transmit from, and measurements at all adjacent receive elements are taken. Elements 1210 and 1211 can also be collectively referred to as elements 130.

In one example, each of these 8 patterns (FIG. 12) can be done simultaneously across the antenna assembly array. Measuring the entire antenna assembly array (for inter-antenna assembly calibration) can be done in 16 steps (8-steps for top and bottom edge and 8-steps for left and right edge). In another example, some or all of these 8 patterns can be done across the antenna assembly array at different time.

While simultaneous measurements quicken the calibration process, one should consider the following factors. Referring to FIGS. 3A-3C, 5, 6:

amplitudes to a common reference within an antenna assembly could be done once all the measurements are finished.

Inter-antenna assembly Tx path, Rx path (both amplitude and phase) and Carrier phases are aligned next taking one antenna assembly as reference and then propagating the alignment from one-end of the array to the other-end or middle of the array to edges of the array. To minimize the accumulation of errors during propagation, the measurements must be accurate to start with. This can be done by increasing the integration time for inter-antenna assembly measurements. Rationalization and consolidation of measurements can be done simultaneously in a central processor as shown next.

For an N×N antenna assembly array there are 2N×(N−1) differential measurements (Tx path, Rx path and carrier phase references, shown in the matrix below):

$$\begin{bmatrix} \begin{bmatrix} - \\ - \end{bmatrix} & \begin{bmatrix} \Delta\phi_{12L} \\ - \end{bmatrix} & \begin{bmatrix} \Delta\phi_{13L} \\ - \end{bmatrix} & \begin{bmatrix} \Delta\phi_{14L} \\ - \end{bmatrix} & \cdots & \begin{bmatrix} \Delta\phi_{1(N-1)L} \\ - \end{bmatrix} & \begin{bmatrix} \Delta\phi_{1NL} \\ - \end{bmatrix} \\ \begin{bmatrix} - \\ \Delta\phi_{21T} \end{bmatrix} & \begin{bmatrix} \Delta\phi_{22L} \\ \Delta\phi_{22T} \end{bmatrix} & \begin{bmatrix} \Delta\phi_{23L} \\ \Delta\phi_{23T} \end{bmatrix} & \begin{bmatrix} \Delta\phi_{24L} \\ \Delta\phi_{24T} \end{bmatrix} & \cdots & \begin{bmatrix} \Delta\phi_{2(N-1)L} \\ \Delta\phi_{2(N-1)T} \end{bmatrix} & \begin{bmatrix} \Delta\phi_{2NL} \\ \Delta\phi_{2NT} \end{bmatrix} \\ \begin{bmatrix} - \\ \Delta\phi_{31T} \end{bmatrix} & \begin{bmatrix} \Delta\phi_{32L} \\ \Delta\phi_{32T} \end{bmatrix} & \begin{bmatrix} \Delta\phi_{33L} \\ \Delta\phi_{33T} \end{bmatrix} & \begin{bmatrix} \Delta\phi_{34L} \\ \Delta\phi_{34T} \end{bmatrix} & \cdots & \begin{bmatrix} \Delta\phi_{3(N-1)L} \\ \Delta\phi_{3(N-1)T} \end{bmatrix} & \begin{bmatrix} \Delta\phi_{3NL} \\ \Delta\phi_{3NT} \end{bmatrix} \\ \begin{bmatrix} - \\ \Delta\phi_{41T} \end{bmatrix} & \begin{bmatrix} \Delta\phi_{42L} \\ \Delta\phi_{42T} \end{bmatrix} & \begin{bmatrix} \Delta\phi_{43L} \\ \Delta\phi_{43T} \end{bmatrix} & \begin{bmatrix} \Delta\phi_{44L} \\ \Delta\phi_{44T} \end{bmatrix} & \cdots & \begin{bmatrix} \Delta\phi_{4(N-1)L} \\ \Delta\phi_{4(N-1)T} \end{bmatrix} & \begin{bmatrix} \Delta\phi_{4NL} \\ \Delta\phi_{4NT} \end{bmatrix} \\ \vdots & \vdots & \vdots & \vdots & \ddots & \vdots & \vdots \\ \begin{bmatrix} - \\ \Delta\phi_{(N-1)1T} \end{bmatrix} & \begin{bmatrix} \Delta\phi_{(N-1)2L} \\ \Delta\phi_{(N-1)2T} \end{bmatrix} & \begin{bmatrix} \Delta\phi_{(N-1)3L} \\ \Delta\phi_{(N-1)3T} \end{bmatrix} & \begin{bmatrix} \Delta\phi_{(N-1)4L} \\ \Delta\phi_{(N-1)4T} \end{bmatrix} & \cdots & \begin{bmatrix} \Delta\phi_{(N-1)(N-1)L} \\ \Delta\phi_{(N-1)(N-1)T} \end{bmatrix} & \begin{bmatrix} \Delta\phi_{(N-1)NL} \\ \Delta\phi_{(N-1)NT} \end{bmatrix} \\ \begin{bmatrix} - \\ \Delta\phi_{N1T} \end{bmatrix} & \begin{bmatrix} \Delta\phi_{N2L} \\ \Delta\phi_{N2T} \end{bmatrix} & \begin{bmatrix} \Delta\phi_{N3L} \\ \Delta\phi_{N3T} \end{bmatrix} & \begin{bmatrix} \Delta\phi_{N4L} \\ \Delta\phi_{N4T} \end{bmatrix} & \cdots & \begin{bmatrix} \Delta\phi_{N(N-1)L} \\ \Delta\phi_{N(N-1)T} \end{bmatrix} & \begin{bmatrix} \Delta\phi_{NNL} \\ \Delta\phi_{NNT} \end{bmatrix} \end{bmatrix}$$

1. Tx FEM has filters that pass signals with transmit frequencies only and Rx FEM has filters that pass signals with receive frequency only. The Tx and Rx FEMs are switched to an all-pass path during Rx and Tx calibration to allow them to pass receive and transmit frequencies respectively during calibration. Therefore, Tx and Rx FEMs cannot be calibrated simultaneously. When the Tx FEM is calibrated, the bypass Rx FEM values are discarded and vice versa. The number of steps required to take overall measurements (stated in the previous paragraph) is doubled, one set of steps for Tx calibration, while another for Rx calibration.

2. Tx or Rx beamforming is momentarily paused for the element that is making the calibration measurement. If same element in every antenna assembly participates in calibration for parallel measurements (as indicated during description of measurement steps), then it can lead to generation of grating lobes (as illustrated in first column of FIG. 13) due to periodic Tx or Rx muting of elements in the array and impacts the service. Therefore, the elements in each antenna assembly are selected in a pseudo-random manner to minimize the degradation in beam performance (as illustrated in second column of FIG. 13).

Figure 13:
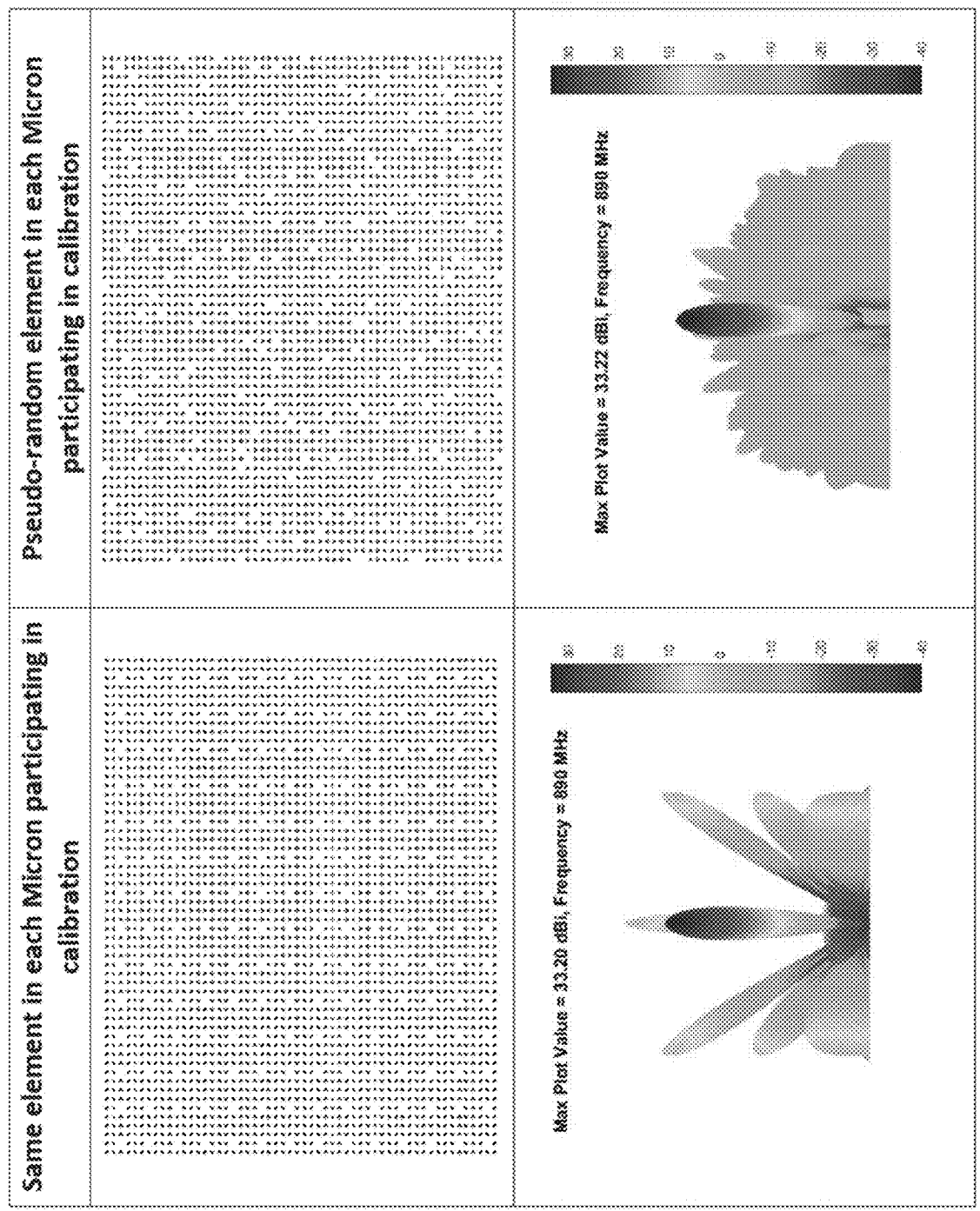
FIG. 13 illustrates effect of uniform vs pseudo-random element selection during calibration on beamforming.

3. FIG. 13 showed pseudo-random permutation of elements for one parallel measurement. Other pseudo-random permutations should be exercised sequentially until calibration measurements of all elements are done.

As all antenna assemblies take different element measurements simultaneously, aligning Tx and Rx element phases/

These are consolidated at the central processor, which in turn computes and re-distributes (to the antenna assemblies) the $N^2-1$ element matrix below (using the top-left antenna assembly as a reference). Similar process is repeated for Tx path and Rx path amplitude differential references.

$$\begin{bmatrix} 0 & \phi_{12} & \phi_{13} & \phi_{14} & \cdots & \phi_{1(N-1)} & \phi_{1N} \\ \phi_{21} & \phi_{22} & \phi_{23} & \phi_{24} & \cdots & \phi_{2(N-1)} & \phi_{2N} \\ \phi_{31} & \phi_{32} & \phi_{33} & \phi_{34} & \cdots & \phi_{3(N-1)} & \phi_{3N} \\ \phi_{41} & \phi_{42} & \phi_{43} & \phi_{44} & \cdots & \phi_{4(N-1)} & \phi_{4N} \\ \vdots & \vdots & \vdots & \vdots & \ddots & \vdots & \vdots \\ \phi_{(N-1)1} & \phi_{(N-1)2} & \phi_{(N-1)3} & \phi_{(N-1)4} & \cdots & \phi_{(N-1)(N-1)} & \phi_{(N-1)N} \\ \phi_{N1} & \phi_{N2} & \phi_{N3} & \phi_{N4} & \cdots & \phi_{N(N-1)} & \phi_{NN} \end{bmatrix}$$

the first row and first column are recursively computed as:

$$\phi_{1k} = \phi_{1(k-1)} + \Delta\phi_{1kL}; \; k=2,\ldots,N$$

$$\phi_{k1} = \phi_{(k-1)1} + \Delta_{k1T}; \; k=2,\ldots,N$$

while for other elements, the recursion is:

$$\phi_{kl} = 0.5 \cdot [(\phi_{(k-1)l} + \phi_{klT}) + (\phi_{k(l-1)} - \phi_{klL})]; \; k,l=2,\ldots,N$$

The array's center can be the reference and this procedure can propagate in 4 quadrants (NW, NE, SE and SW) in order to reduce phase error propagation.

Pseudo-random simultaneous calibration measurements, within a Micron and in all Microns in the phased-array antenna enable on-line calibration within a time duration in which calibration parameters change significantly (e.g., due to temperature changes as a LEO satellite traverses its orbit).

The system provides phased array antenna calibration. It has a mutual coupling system that primarily relates to (a) local (within phased array antenna) calibration that does not involve far-field measurement, and (b) on-line calibration. It enables multiple calibration measurements within a micron and simultaneous measurements across microns, which speed up calibration time. It distinguishes between transmit calibration and receive calibration, particularly when simultaneous measurements are performed. It also has TDD and FDD duplex communication modes, and predistortion to compensate for phased array non-linearities. It can also utilize predistortion to compensate for phased array non-linearities, such as predistortion (DPD) to compensate for power-amplifier nonlinearities. It also utilizes a rationalization procedure so that the entire phased array acts in unison.

As used here, on-line calibration generally refers to concurrently performing calibration and beam-forming (i.e., are servicing traffic and at the same time calibrating). Off-line calibration refers to only calibrating (shutting off traffic). Off-line is done initially (upon system start-up) and off-line calibration is much faster than on-line calibration. On-line calibration adjusts calibration for changes in temperature as the spacecraft orbits the Earth (and the sun angle changes) as well as slow changes as components age.

As we have seen, we obtain a set of differential measurements (say, the difference between one transmit path and another). If there is a common reference (transmit) element in a micron and we know the phase difference between that element and all others, it is clear that that micron can behave like a small phased array by itself—we can rest the reference element's phase to 0 and all others to the difference between it and the others respectively. This is because the micron needs only the phase differences for its elements to act in "unison". However, when we have several microns, each has its own "reference" element and to make the collection of microns act in "unison", we need to pick one micron's reference to be THE reference and then determine the difference between that element and all other microns' reference elements. That last step we mention is rationalization and that is done by the equations above.

A normal amplifier has different amplitude and phase response at different power levels (characterized by what is called AM-AM and AM-PM curves). In other words, we have different calibrations at different power levels. This is undesirable as calibration is only valid when we operate at a low enough input power (what is called input back-off). In this regime, the amplifier is usually very inefficient. In order to linearize the amplifier over a wider range (and into a region where it operates at higher efficiency—at lower back-off—we use a digital pre-distorter (or DPD). Not only is the efficiency better, but calibration performed at one power level is valid at a higher level (or the calibration is valid over a range of input power levels. This is highly desirable. Thus, calibration is valid over a wider range using DPD.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed or an order is otherwise not required based on the description or claim language, it is not intended that any particular order be inferred. Likewise, where a method claim below does not explicitly recite an order mentioned in the description above, it should not be assumed that the order is required by the claim.

The invention claimed is:

1. An antenna array, comprising:
an antenna assembly including a plurality of elements, each of the plurality of elements having a receive path including a receive port and an oscillator, a transmit path including a transmit port, and an element parameter and an oscillator; wherein the antenna assembly is configured to:
  select a reference element from amongst the plurality of elements, the selected reference element having a plurality of direct neighboring elements of the plurality of elements, each of the plurality of direct neighboring elements being directly adjacent the reference element;
  measure a reference combined parameter of the selected reference element by conducting a self-coupling, wherein the reference combined parameter includes a coupling contribution of the receive port and the transmit port of the selected reference element, a receive path contribution from the receive path of the selected reference element, and a transmit path contribution from the transmit path of the selected reference element;
  measure a first combined parameter of the selected reference element and a first neighbor element of the plurality of direct neighboring elements, wherein the first combined parameter includes a coupling contribution between the first neighbor element and the selected reference element, and a path contributions from the receive or transmit path of the first neighbor element and the transmit or receive path of the selected reference element;
  determine a differential parameter according to the first combined parameter and the reference combined parameter; and
  adjust the element parameter of the first neighbor element based on the differential parameter.

2. The antenna array of claim 1, wherein the antenna assembly is further configured to determine the differential parameter by:
  calculating a first difference between the first combined parameter and the reference combined parameter;
  calculating a second difference of the coupling contribution between the first neighbor element and the selected reference element and the coupling contribution of the receive port and the transmit port of the selected reference element; and obtaining the differential parameter by subtracting the second difference from the first difference.

3. The antenna array of claim 1, wherein the antenna assembly is configured to measure the first combined parameter of the selected reference element and the first neighbor element of the plurality of direct neighboring elements by:

tuning the oscillator in the transmit path of the first neighbor element and the oscillator in the receive path of the selected reference element to a transmit frequency and bypassing the receive front-end module of the selected reference element; or tuning the oscillator in the transmit path of the selected reference element and the oscillator in the receive path of to a receive frequency and bypassing the transmit front-end module of the selected reference element.

4. The antenna array of claim 3, wherein the transmit frequency and the receive frequency have different values.

5. The antenna array of claim 1, wherein the antenna assembly is configured to:

measure, in parallel, a plurality of combined parameters of the selected reference element and each neighbor element of the plurality of direct neighboring elements, wherein the plurality of combined parameter each includes a coupling contribution between a neighbor element and the selected reference element, and a path contributions from the receive or transmit path of the neighbor element and the transmit or receive path of the selected reference element.

6. The antenna array of claim 5, wherein the antenna assembly is configured to:

provide in parallel, via the transmit path of each neighbor element of the plurality of direct neighboring elements, a plurality of calibration signals including different tones or Gold codes; and measure in parallel, via the receive path of the selected reference element, the plurality of combined parameters of the selected reference element and each neighbor element of the plurality of direct neighboring elements.

7. The antenna array of claim 5, wherein the antenna assembly is further configured to:

measure, in parallel, the plurality of combined parameters of the selected reference element and each neighbor element of the plurality of direct neighboring elements and the reference combined parameter of the selected reference element.

8. The antenna array of claim 7, wherein the antenna assembly is configured to:

provide in parallel, via the transmit path of each neighbor element of the plurality of direct neighboring elements and via the transmit path of the selected reference element, a plurality of calibration signals including different tones or Gold codes; and measure in parallel, via the receive path of the selected reference element, the plurality of combined parameters of the selected reference element and each neighbor element of the plurality of direct neighboring elements and the reference combined parameter of the selected reference element.

9. The antenna array of claim 5, wherein the antenna assembly is configured to:

provide a calibration signal via the transmit path of the selected reference element; and measure in parallel, via the receive path of each neighbor element of the plurality of direct neighboring elements, the plurality of combined parameters of the selected reference element and each neighbor element of the plurality of direct neighboring elements.

10. The antenna array of claim 9, wherein:

the antenna assembly is a first antenna assembly;

the antenna array includes additional antenna assemblies each including a plurality of elements, each of the plurality of elements having a receive path including a receive port and an oscillator, a transmit path including a transmit port and an oscillator, and an element parameter; and the first and additional antenna assemblies are configured to measure, in parallel, a plurality of combined parameters of the selected reference element and each neighbor element of the plurality of direct neighboring elements.

11. The antenna array of claim 1, wherein:

the plurality of elements are arranged in rows and columns, and the neighboring elements are directly adjacent in a same row, same column, or diagonal.

12. The antenna array of claim 1, wherein the element parameter comprises a phase or logarithm of amplitude of first neighbor element.

13. An antenna array, comprising:

first and antenna assemblies each including a plurality of elements, each of the plurality of elements having a receive path including a receive port and an oscillator, a transmit path including a transmit port, and an element parameter and an oscillator;

wherein the first and second antenna assemblies are configured to:

measure a reference combined parameter of a selected reference element of the first plurality of elements, wherein the reference combined parameter includes a coupling contribution of the receive port and the transmit port of the selected reference element, a receive path contribution from the receive path of the selected reference element, and a transmit path contribution from the transmit path of the selected reference element;

measure a first combined parameter of the selected reference element and a first neighbor element being adjacent or diagonal with respect to the reference element and in the first and second antenna assemblies, wherein the first combined parameter includes a coupling contribution between the first neighbor element and the selected reference element, and a path contributions from the receive or transmit path of the first neighbor element and the transmit or receive path of the selected reference element;

determine a differential parameter according to the first combined parameter and the reference combined parameter; and adjust a parameter of the first neighbor element according to the differential parameter, the parameter of first neighbor element being a phase or logarithm of amplitude of first neighbor element.

14. The antenna array of claim 13, wherein the first and second antenna assemblies are configured to determine the differential parameter by:

calculating a first difference between the first combined parameter and the reference combined parameter;

calculating a second difference of the coupling contribution between the first neighbor element and the selected reference element and the coupling contribution of the receive port and the transmit port of the selected reference element; and obtaining the differential parameter by subtracting the second difference from the first difference.

15. The antenna array of claim 13, wherein the first and second antenna assemblies are further configured to measure the first combined parameter of the selected reference element and the first neighbor element of the plurality of direct neighboring elements by:

tuning the oscillator in the transmit path of the first neighbor element and the oscillator in the receive path of the selected reference element to a transmit frequency and bypassing the receive front-end module of the selected reference element; or tuning the oscillator in the transmit path of the selected reference element and the oscillator in the receive path of to a receive frequency and bypassing the transmit front-end module of the selected reference element.

16. The antenna array of claim 13, wherein the transmit frequency and the receive frequency have different values.

17. An antenna array, comprising:
an antenna assembly including a plurality of elements;
wherein the antenna assembly is configured to:
obtain a plurality of combined phases by measuring combined phases of each element with the element itself and with neighbor elements, wherein each of the plurality of combined phases includes contributions from a receive phase, a transmit phase, and a coupling phase;
obtain a vector having each of the plurality of combined phases as an entry of the vector;
obtain a sparse matrix corresponding to the vector; and
obtain a plurality of receive phases, a plurality of transmit phases, and a plurality of coupling phases of the plurality of elements according to the sparse matrix and the vector.

18. The antenna array of claim 17, wherein:
the vector formed by the plurality of combined phases is a first vector; and
the antenna assembly is configured to obtain the plurality of receive phases, the plurality of transmit phases, and the plurality of coupling phases of the plurality of elements by:
obtaining a second vector according to the sparse matrix and the first vector, wherein entries of the second vector correspond to the plurality of receive phases, the plurality of transmit phases, and the plurality of coupling phases of the plurality of elements.

19. The antenna array of claim 18, wherein the antenna assembly is configured to obtain the second vector by:
an iterative calculation according to the sparse matrix, the first vector, and an guess vector for the second vector.

20. An antenna array, comprising:
a first antenna assembly including a first plurality of edge elements at an edge of the first antenna assembly; and
a second antenna assembly adjacent to the first antenna assembly and including a second plurality of edge elements at an edge of the second antenna assembly, wherein the second plurality of edge elements are adjacent to and aligned with the first plurality of edge elements;
wherein the first and second antenna assemblies are configured to:
obtain a plurality of combined phases by measuring combined phases of each edge element of the first plurality and second plurality of edge elements with neighbor elements in the first plurality and second of edge elements and in the adjacent antenna assembly, wherein each of the plurality of combined phases includes contributions from a receive phase, a transmit phase, a coupling phase, and a carrier phase;
obtain a vector according to the obtained plurality of combined phases and the transmit and receive phases of the first and second plurality of edge elements;
obtain a sparse matrix corresponding to the vector; and
obtain a plurality of coupling phases and a carrier phase of the first and second plurality of edge elements according to the sparse matrix and the vector.

21. The antenna array of claim 20, wherein measuring combined phases of each edge element of the first plurality and second plurality of edge elements with neighbor elements in the first plurality and second of edge elements and in the adjacent antenna assembly includes:
transmitting from an edge element of the first plurality of edge elements and taking measurements at edge elements of the second plurality of edge elements that are adjacent or diagonal to the edge element of the first plurality of edge elements; and
transmitting from an edge element of the second plurality of edge elements and taking measurements at edge elements of the first plurality of edge elements that are adjacent or diagonal to the edge element of the second plurality of edge elements.

22. The antenna array of claim 20, wherein:
the obtained vector is a first vector; and
the antenna assembly is configured to obtain the plurality of coupling phases and the carrier phase of the first and second plurality of edge elements by:
obtaining a second vector according to the sparse matrix and the first vector, wherein entries of the second vector correspond to the plurality of coupling phases and the carrier phase of the first and second plurality of edge elements.

23. The antenna array of claim 22, wherein the antenna assembly is configured to obtain the second vector by:
an iterative calculation according to the sparse matrix, the first vector, and an guess vector for the second vector.

* * * * *